(12) United States Patent
Noda et al.

(10) Patent No.: US 7,196,984 B2
(45) Date of Patent: Mar. 27, 2007

(54) OPTICAL DISK MEDIUM AND OPTICAL DISK RECORDING AND REPRODUCING APPARATUS

(75) Inventors: Chosaku Noda, Kawasaki (JP); Hiroharu Sato, Tokyo (JP); Hideaki Ohsawa, Yokohama (JP); Yutaka Yamanaka, Tokyo (JP); Kinji Kayanuma, Tokyo (JP); Toshiaki Iwanaga, Tokyo (JP)

(73) Assignees: Kabushiki Kaisha Toshiba, Tokyo (JP); NEC Corporation, Tokyo (JP)

( * ) Notice: Subject to any disclaimer, the term of this patent is extended or adjusted under 35 U.S.C. 154(b) by 604 days.

(21) Appl. No.: 10/780,674

(22) Filed: Feb. 19, 2004

(65) Prior Publication Data

US 2004/0228255 A1    Nov. 18, 2004

(30) Foreign Application Priority Data

Feb. 19, 2003   (JP)   ............................. 2003-040444

(51) Int. Cl.
    *G11B 7/24* (2006.01)
(52) U.S. Cl. ............................. 369/47.19; 369/275.3; 369/59.25; 369/59.26
(58) Field of Classification Search .................... None
    See application file for complete search history.

(56) References Cited

U.S. PATENT DOCUMENTS

| 4,456,981 | A | * | 6/1984 | Silvy et al. .................. 365/234 |
| 5,528,569 | A | * | 6/1996 | Fujiie et al. .............. 369/47.31 |
| 6,079,043 | A | * | 6/2000 | Yoshiura et al. ............. 714/758 |
| 6,262,950 | B1 | * | 7/2001 | Narahara et al. ........... 369/30.1 |

FOREIGN PATENT DOCUMENTS

| JP | 4-172623 | 6/1992 |
| JP | 2663817 | 6/1997 |
| JP | 11-149644 | 6/1999 |
| JP | 2000-11460 | 1/2000 |
| JP | 2001-34952 | 2/2001 |

* cited by examiner

*Primary Examiner*—Wayne Young
*Assistant Examiner*—Minerva Rivero
(74) *Attorney, Agent, or Firm*—Oblon, Spivak, McClelland, Maier & Neustadt, P.C.

(57) ABSTRACT

A recording data string is composed of a plurality of synchronous frames each of which has synchronous data and coding data. Data items in the coding data contributed to creation of the same column of the error correction code are arranged at regular intervals of E in the recording data string. A data segment length L is obtained by adding an additional synchronous frame to the recording data string. Wherein, a physical segment length A satisfies the equation L=mA, m is a natural number. And A is set indivisible by E.

8 Claims, 25 Drawing Sheets

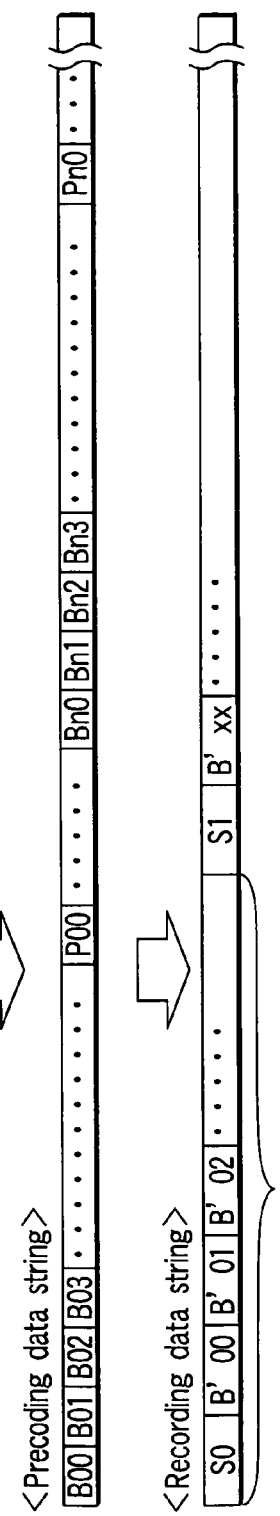
FIG. 2A  FIG. 2B  FIG. 2C  FIG. 2D

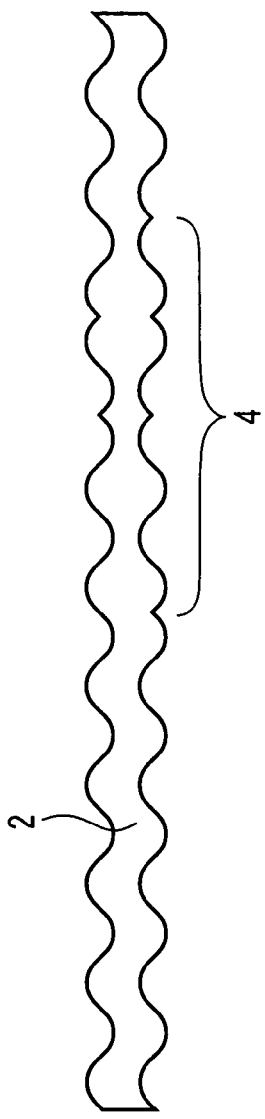
F I G. 5
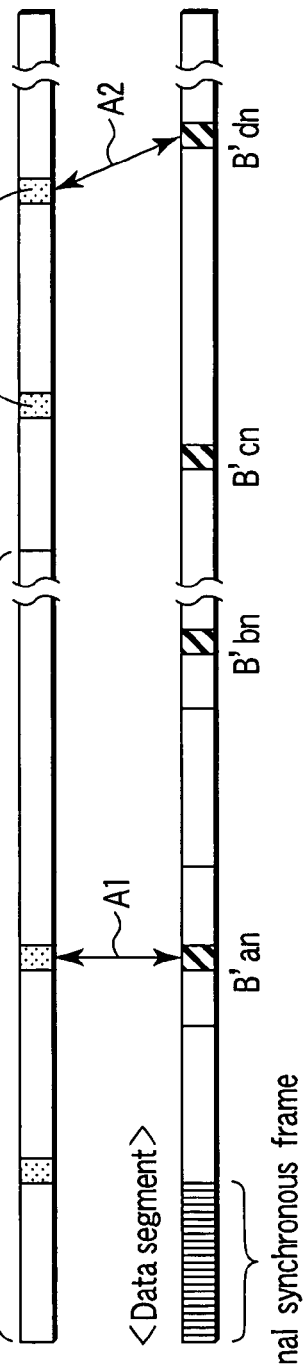
F I G. 6
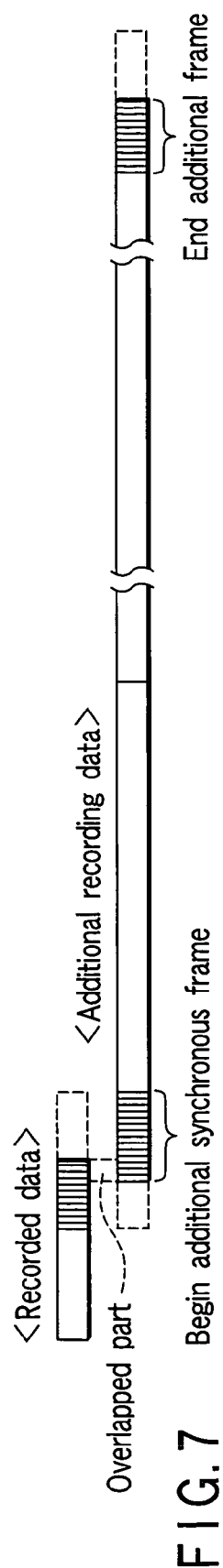
F I G. 7

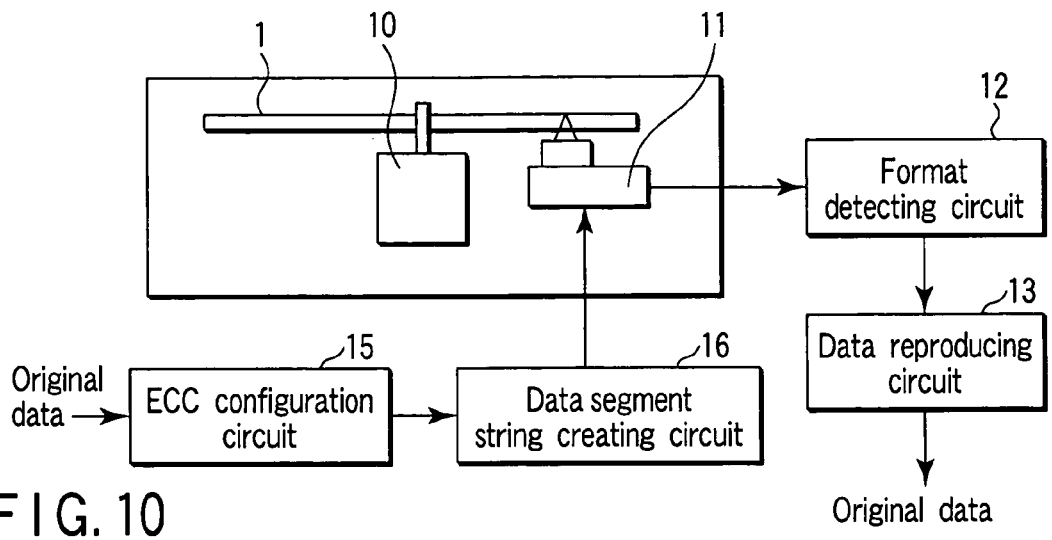
FIG. 10
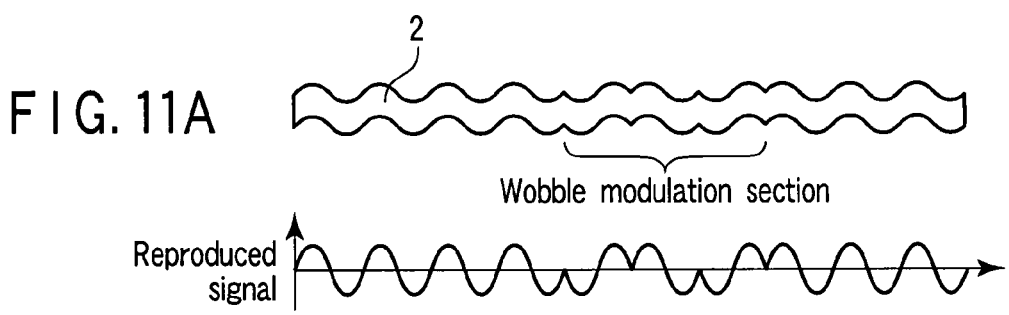
FIG. 11A
FIG. 11B
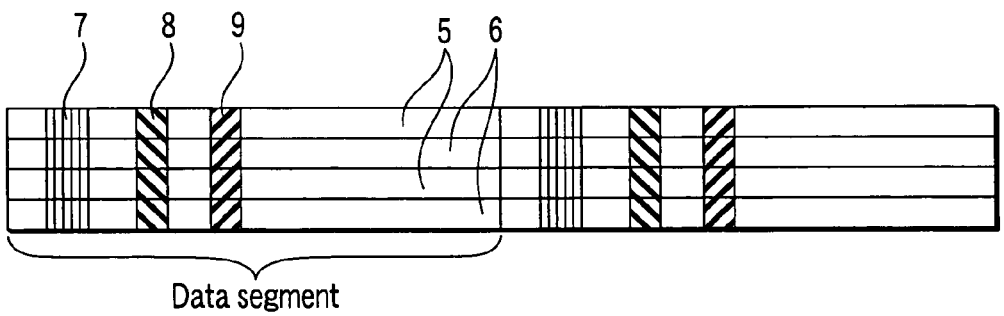
FIG. 12
FIG. 13
```
Binary code      Gray code
 000000           000000
 000001           000001
 000010           000011
 000011           000010
 000100           000110
 000101           000111
 000110           001111
```

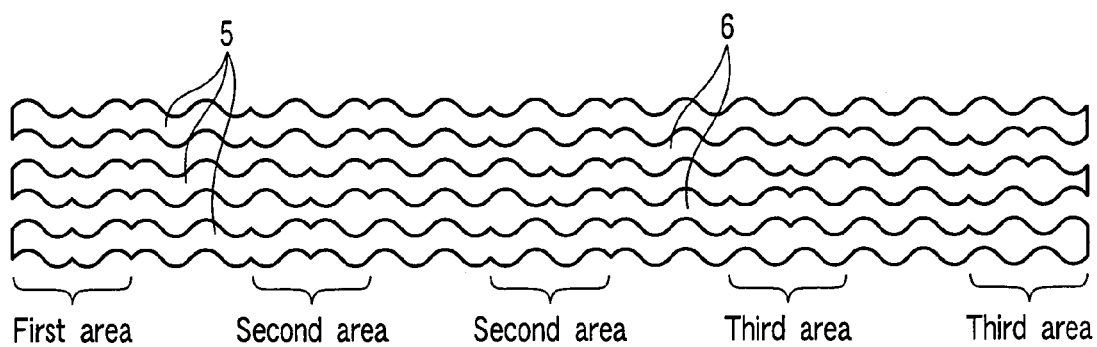
FIG. 14
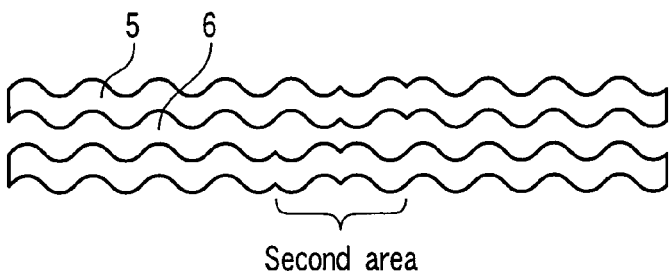
FIG. 15A
FIG. 15B Groove reproduced signal
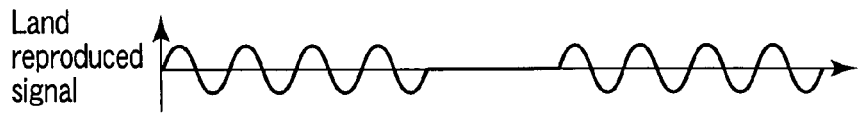
FIG. 15C Land reproduced signal
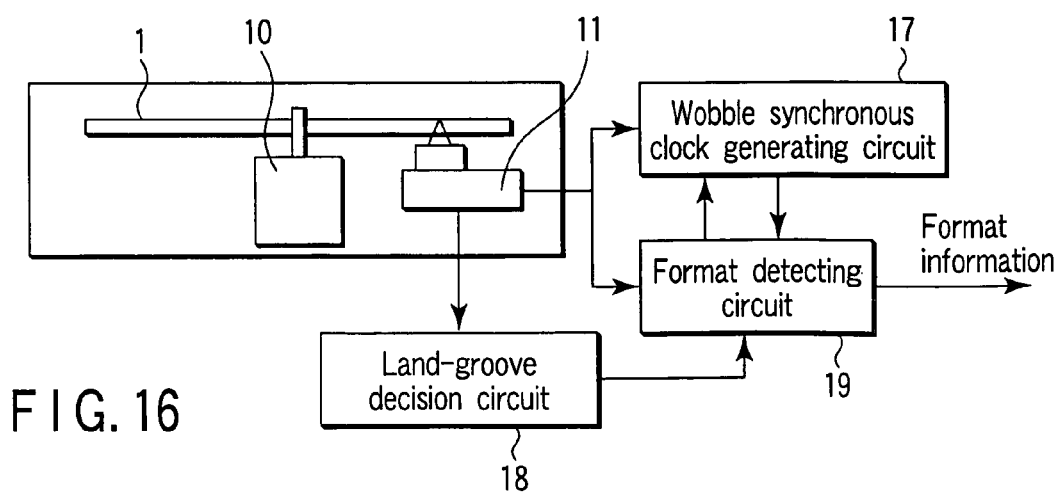
FIG. 16

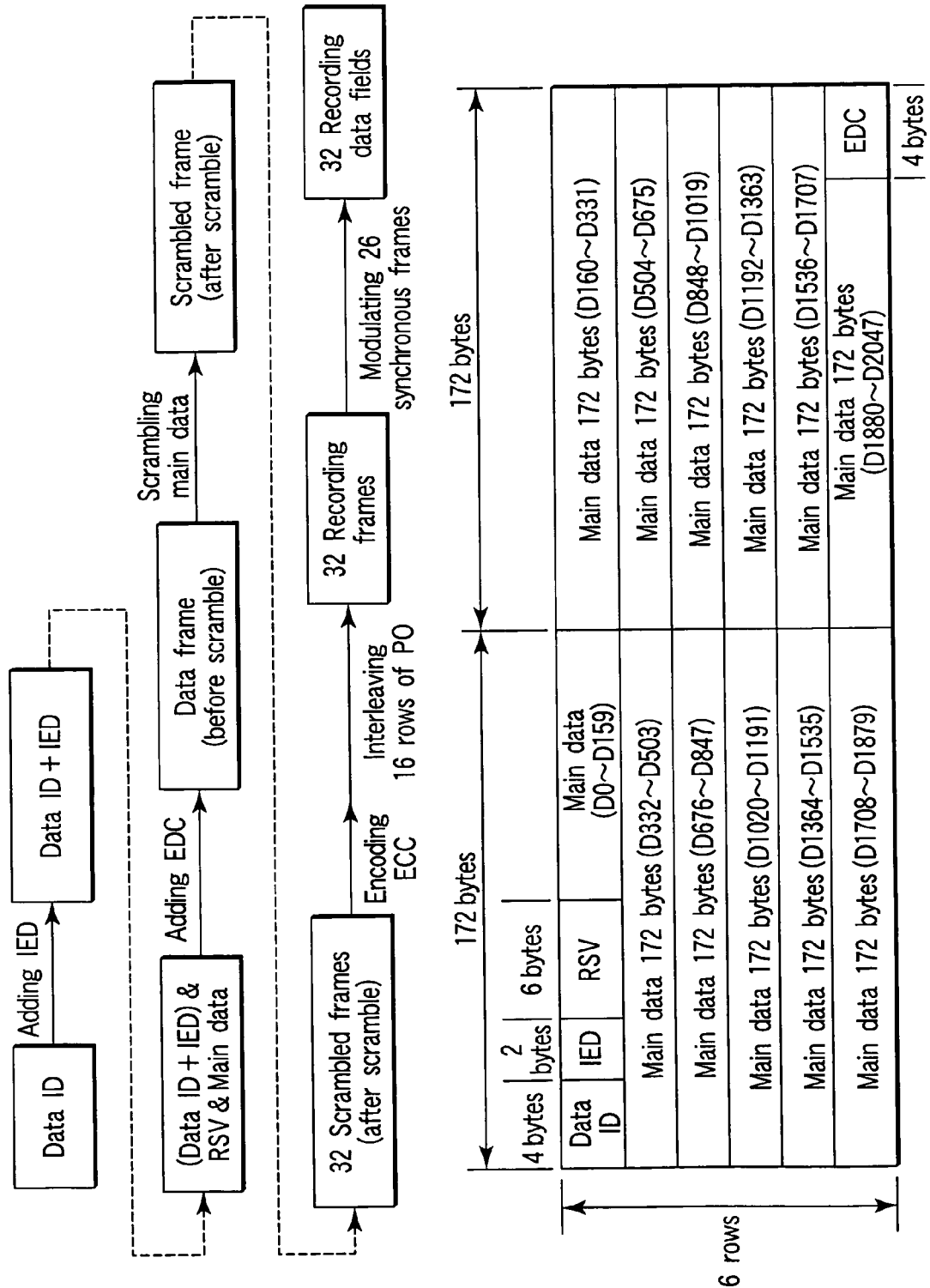
F I G. 17
F I G. 18

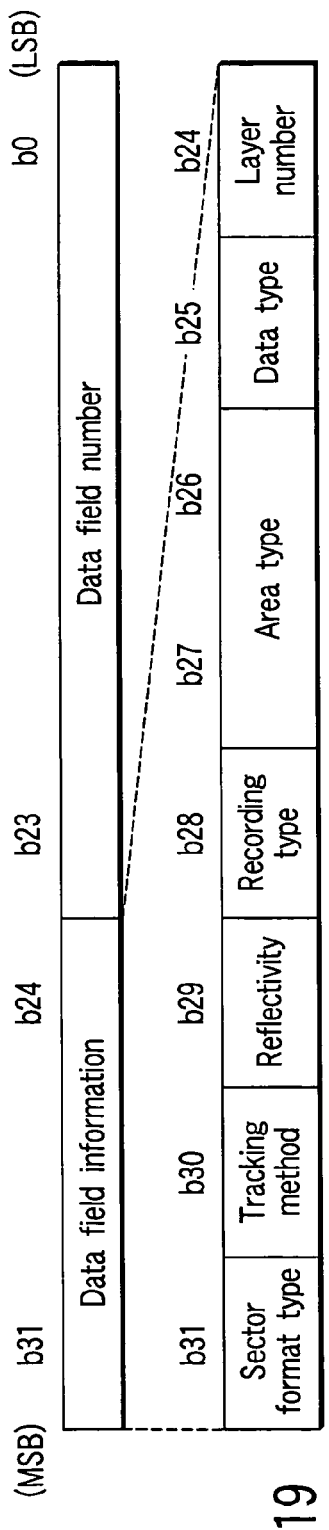
FIG. 19
| Initial preset number | Initial preset value | Initial preset number | Initial preset value |
|---|---|---|---|
| 0h | 0001h | 8h | 0010h |
| 1h | 5500h | 9h | 5000h |
| 2h | 0002h | 0Ah | 0020h |
| 3h | 2A00h | 0Bh | 2001h |
| 4h | 0004h | 0Ch | 0040h |
| 5h | 5400h | 0Dh | 4002h |
| 6h | 0008h | 0Eh | 0080h |
| 7h | 2800h | 0Fh | 0005h |
FIG. 20A  Initial value of shift register
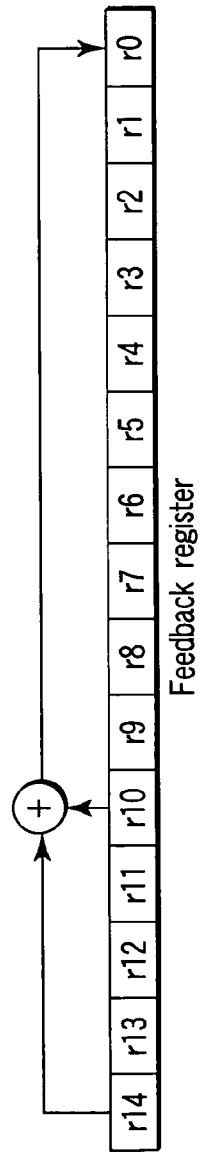
FIG. 20B  Feedback register (ECC block structure)

(Arrangement of scrambled frames)

F I G. 25

State0

| | | (MSB) Primary SYNC codes (LSB) | | (MSB) Secondary SYNC codes (LSB) |
|---|---|---|---|---|
| SY0 | = | 000010 101000 000000 001001 | / | 000010 001000 000000 001001 |
| SY1 | = | 100001 001000 000000 001001 | / | 100010 101000 000000 001001 |
| SY2 | = | 100100 001000 000000 001001 | / | 101000 101000 000000 001001 |
| SY3 | = | 101000 001000 000000 001001 | / | 101010 001000 000000 001001 |

State1

| | | (MSB) Primary SYNC codes (LSB) | | (MSB) Secondary SYNC codes (LSB) |
|---|---|---|---|---|
| SY0 | = | 000100 101000 000000 001001 | / | 000100 001000 000000 001001 |
| SY1 | = | 001001 001000 000000 001001 | / | 001010 101000 000000 001001 |
| SY2 | = | 010000 101000 000000 001001 | / | 010000 001000 000000 001001 |
| SY3 | = | 010100 001000 000000 001001 | / | 010101 001000 000000 001001 |

(SYNC code)

FIG. 26A Data segment format: Guard area | Guard VFO,PS,etc | ECC block (32 Data frame) | Guard PA,etc | Guard area FIG. 26B Physical segment 0: 1, 2, 3, 4, 5, 6

FIG. 26C Physical segment format: 0, 1, 2, 3, 4, 5, 6, 7, 8, 9, 10, 11, 12, 13, 14, 15, 16

FIG. 26D Wobble data unit (Primary): 1b | 0b | bit 2 | bit 1 | bit 0 | 0b
2 wobble | 2 wobble | 4 wobble | 4 wobble | 4 wobble | 68 wobble
(42 wobble)

FIG. 26E Wobble data unit (Secondary for R): 1b | 0b | bit 2 | bit 1 | bit 0 | 0b
2 wobble | 2 wobble | 4 wobble | 4 wobble | 4 wobble | 26 wobble Example of Gray code

| Decimal number | Conventional binary representation | Gray code representation |
| --- | --- | --- |
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |
| 13 | 1101 | 1011 |
| 14 | 1110 | 1001 |
| 15 | 1111 | 1000 |

FIG. 36

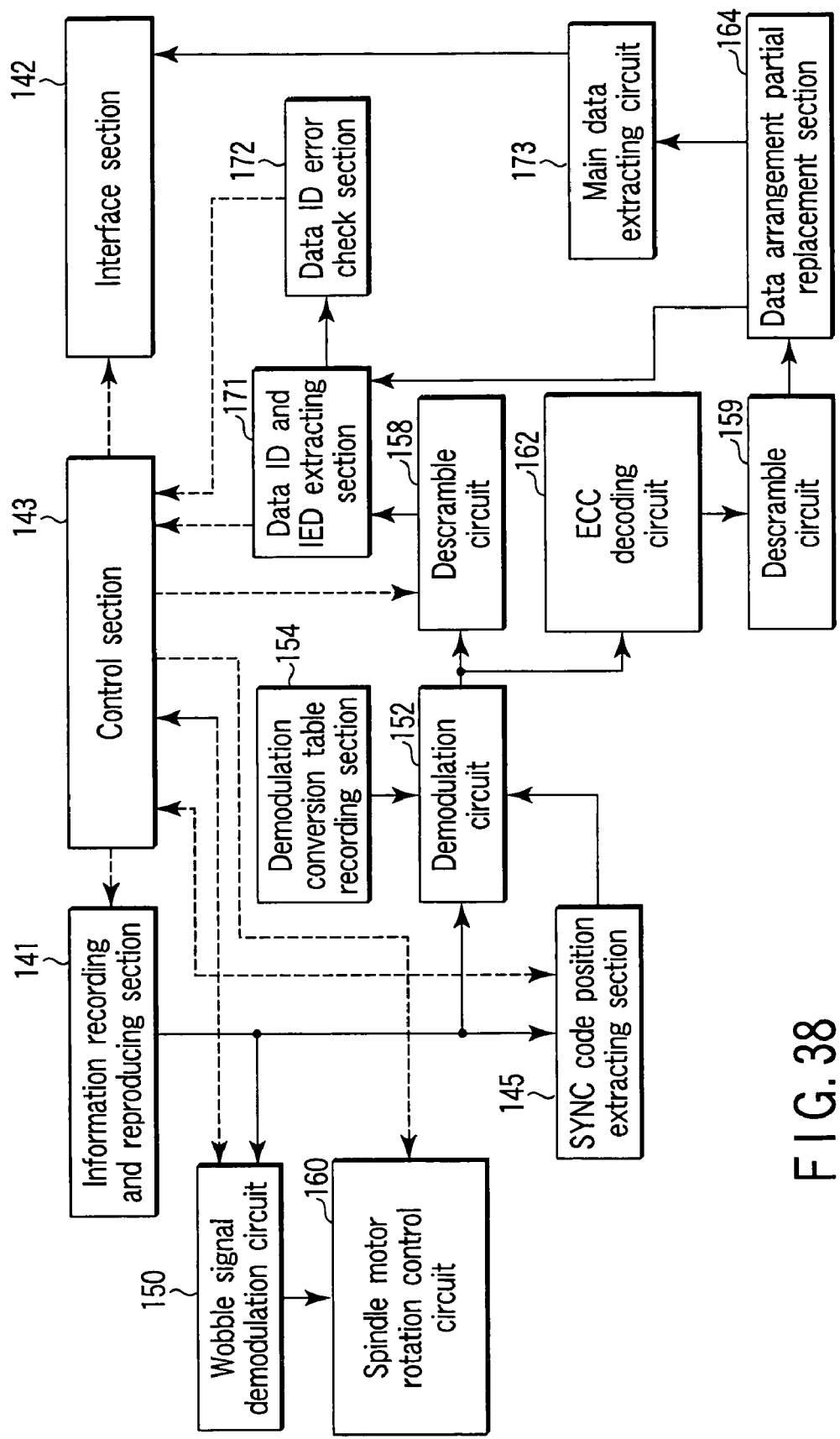
F I G. 38

OPTICAL DISK MEDIUM AND OPTICAL DISK RECORDING AND REPRODUCING APPARATUS

CROSS-REFERENCE TO RELATED APPLICATIONS

This application is based upon and claims the benefit of priority from the prior Japanese Patent Application No. 2003-040444, filed Feb. 19, 2003, the entire contents of which are incorporated herein by reference.

BACKGROUND OF THE INVENTION

1. Field of the Invention

This invention relates to an optical disk medium and an optical disk recording and reproducing apparatus which are capable of recording and reproducing information with a very small light spot.

2. Description of the Related Art

In a recording optical disk, preformat information has been recorded on the optical disk. When data is recorded onto the optical disk with an optical disk unit, the preformat information is detected and the recording position for the data is determined by reference to the detected information.

Usually, the recording track formed in spiral fashion on the optical disk is divided into physical segments of a specific length. Addresses representing locations are allocated to the individual segments. The addresses are written as preformatted data.

In an optical disk with a CLV configuration where the recording line density is constant, all of the physical segment lengths are the same. When a physical segment is too long, the time required to seek address information in random access increases. Therefore, a length composed of ten to several tens of physical segments in one circumference is selected.

One known preformatting method is to form a prepit at the head of a segment. In this method, however, the prepit part cannot be used as a data area. To overcome this problem, another known method used in a recent recording medium is to record format information in such a manner that the information is superimposed on the data recording track in the form of a wobble signal caused by the wobbling of the groove.

When the format information is recorded using a wobble signal, such modulation as phase inversion or frequency change is performed. In +R, such an approach is used. In DVD-R, a method of forming prepits discretely on a land between grooves to create format information has been used.

As for the data to be recorded, error correction codes are created for the original data and then the original data is further divided into smaller synchronous frames to form recording data. For example, in a DVD (digital versatile disk), an error correction code block (ECC block) is modulated. Synchronous codes are added at specific intervals, thereby forming a plurality of synchronous frames. The synchronous frames are used as recording data.

Patent documents related to optical disks are as follows:
Jpn. Pat. No. 2,633,817 (reference 1):

A Identification information is shared by a land (L) and a groove (G) and deviates from the center of the land and groove. This is related to the present DVD-RAM disk standard.

Jpn. Pat. Appln. KOKAI Publication No. 4-172623 (reference 2), Jpn. Pat. Appln. KOKAI Publication No. 2000-11460 (reference 3): A recording mark is formed at the position of a groove. The land part has a land prepit for an address. This is related to the present DVD-RW disk and DVD-R disk.

Jpn. Pat. Appln. KOKAI Publications No. 11-149644, No. 2001-34952 (references 4 and 5): A method of recording data in an L (land)/G (groove). Address information is recorded by wobble modulation using the Gray code.

In the case of DVDs, 416 synchronous frames constitute the minimum unit in recording data. Generally, since the data recording length is larger than the physical segment length, a recording data string equivalent to one ECC structure is recorded over a plurality of physical segments. At this time, to facilitate a search after the recording, the recording data string equivalent to one ECC structure is designed to be equal to the length of an integer number of physical segments. In addition, the physical segment length is designed to fit into an integer number of synchronous frames. For the length L of the recording data string, the physical segment length A is expressed as $L=mA$ where m is a natural number. For example, in the +R format, $m=4$ is satisfied and 104 synchronous frames are recorded in one physical segment.

The problems here are that highly correlative data items are arranged at regular intervals in the recording data string and that format modulation sections (for example, address information) are present at regular intervals also in a physical segment. If the regular intervals of one of them are an integral multiple of the regular intervals of the other, the data belonging to a column in the ECC matrix is superimposed on the format modulation section.

The ECC matrix configured two-dimensionally has a high capability of correcting errors occurring at random. However, when errors concentrate in a specific column or row, the reliability of correcting errors decreases as compared with the case where errors take place at random.

In the case of DVDs that secure a recording/reproducing margin to some extent, there is not too serious a problem in practical use. However, in the case of next-generation optical disks with much higher recording density, the present configuration has the problem that the format information has too significant an effect on the deterioration of the recording/reproducing data.

Furthermore, in recent years, optical disks have been required to have much larger capacity. To realize this, a so-called land-groove optical disk has been developed which uses not only grooves made in an optical disk but also a land between grooves as recording tracks. In the case of the land-groove optical disk, however, the problem is how to configure format information (addresses) for the land recording track and format information (addresses) for the groove recording track.

BRIEF SUMMARY OF THE INVENTION (A) An object of the present invention is to provide an optical disk medium, an optical disk recording and reproducing apparatus, an optical disk recording and reproducing method which are capable of making good high-density recordings without causing the aforementioned problems.

(B) Another object of the present invention is to provide an optical disk medium, an optical disk recording and reproducing apparatus, an optical disk recording and reproducing method which are capable of detecting format information stably by using a wobble method as a method of recording format information on a land-groove optical disk.

According to an aspect of the present invention, on an optical disk medium, a spiral recording track is divided into physical segments of a specific length each of which has a pre-format modulation section formed in a specific position of a part of the segment, a recording data string is composed of a plurality of synchronous frames each of which is formed by dividing an original data string of a specific length into blocks, creating error correction codes, adding the error correction codes to the blocks, and further placing a fixed number of data items converted into synchronous data and coding data.

And data items in the coding data contribute to the creation of the same column error correction code which are arranged a regular intervals of E in the recording data string, with a data segment length L obtained by adding an additional synchronous frame to the recording data string and a physical segment length A satisfying the equation L=mA where m is a natural number and, A is set indivisible by E.

According to another aspect of the present invention, in an optical disk medium with a spiral recording track having a groove recording track and a land recording track arranged alternately, a plurality of zones are set radially in such a manner that they are aligned radially, the recording tracks are divided into physical segments each of which has a prospect angle with respect to the center of the optical disk and has a format information recording area set in a part of the segment, the format information recording area being divided into a first area in which format information common to the groove recording tracks and land recording tracks is recorded, a second area in which format information inherent to the groove recording tracks is recorded, and a third area in which format information inherent to the land recording tracks is recorded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2D are explanatory diagrams of an ECC block for recording data onto an optical disk and its recording data strings;

FIG. 5 is an explanatory diagram of the information part of wobble modulated waves;

FIG. 6 is an explanatory diagram to help explain the relationship between the repetitive data part included in the recording data string and the information part of the wobble modulated wave in the physical segment;

FIG. 7 is an explanatory diagram of a joint connecting additional synchronous frames in a recording data string;

FIG. 10 is a diagram showing a configuration of an optical disk apparatus related to the present invention;

FIGS. 11A and 11B show a recording track structure in which format information is recorded in wobbles and an example of its detected signal;

FIG. 12 is an explanatory diagram showing a physical segment configured to reduce the amount of inherent information in a recording track remarkably;

FIG. 13 shows the Gray code;

FIG. 14 is an explanatory diagram to help explain an embodiment where format information is written by the phase modulation of wobbles;

FIGS. 15A, 15B, and 15C show an arrangement of format information created in wobbles in the vicinity of a second area and detected reproduced signals from wobbles;

FIG. 16 is a diagram showing an embodiment of a recording and reproducing apparatus related to the present invention;

FIG. 17 is an explanatory diagram showing the steps that the data changes from main data to recording frames and is recorded onto a recording medium;

FIG. 18 is an explanatory diagram showing the form of the initial data frames in obtaining a recording data string;

FIG. 19 is an explanatory diagram of the data ID in FIG. 18;

FIGS. 20A and 20B show an example of the initial value given to the feedback shift register in creating a scrambled frame and an example of the feedback shift register in creating a scramble byte;

FIG. 25 is an explanatory diagram showing an example of various types of synchronous codes (SYNC);

FIGS. 26A to 26E schematically show the way a recording ECC block is placed physically on a recording track;

FIG. 36 shows an example of the Gray code;

FIG. 38 is an explanatory diagram showing an apparatus for a reproducing system related to the present invention.

DETAILED DESCRIPTION OF THE INVENTION

Hereinafter, by referring to the accompanying drawings, embodiments of the present invention will be explained.

Figure 1:
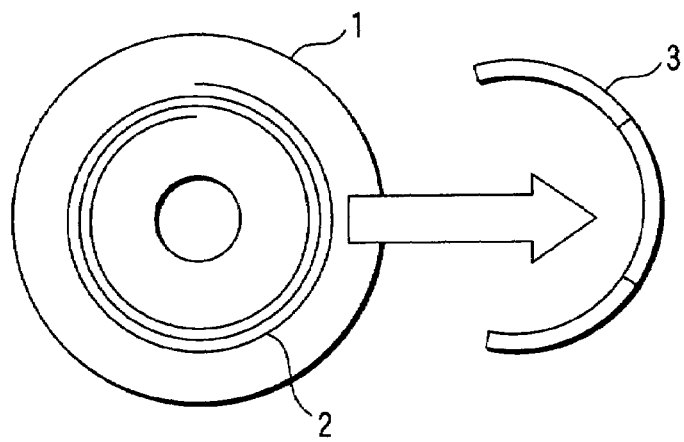
FIG. 1 is a schematic explanatory diagram of an optical disk related to the present invention.

Before explanation of a concrete example of the present invention, underlying techniques will be described. In FIG. 1, an optical disk 1 generally has a recording track 2 formed spirally. The recording track 2 is divided into physical segments of a specific length. An address is allocated to each of the physical segments 3. The address is written into each segment as preformat data.

In an optical disk using the CLV system in which the recoding line density is constant, all of the physical segment lengths are equal. Since too long physical segment lengths lead to an increase in the time required to search for address information in random access, such a length as contains ten to several tens of physical segments 3 in one circumference is selected.

One preformatting method is to form a prepit at the head of a physical segment 3. The preformat part cannot be used as a data area. To overcome this problem, there is a method that forms a wobble signal by the wobbling of the groove in the data recording track and represents format information using the wobble signal.

When the format information is recorded in wobbles, a wobble signal subjected to modulation, such as phase inversion or frequency variation is recorded. +R uses such an approach. On the other hand, in DVD-R, prepits are formed discretely in a land between grooves, thereby representing the format information.

Next, a recording date string in a DVD will be explained by reference to FIGS. 2A to 2D.

ID information and others are added to digital data to be recorded. The resulting data is then scrambled, which creates original data string B00, B01, B02, ... before the construction of ECC (FIG. 2A). The individual byte components in the original data string are arranged in a two-dimensional matrix to construct ECC (FIG. 2B).

A matrix composed of original data B00, B01, B02, ... contains 192 rows×172-byte columns. For the data arrangement in the row direction, 10 bytes of PI are created as inner parity and added to each row in the form of P00, P01, .... From the arrangement of PO in the row direction, too, parity is created and added to the matrix in the form of R00, R01, ....

In this way, 208 row×182-byte columns are created as an ECC-configuration matrix. After the rows in the matrix are replaced and the rows in the PO are rearranged, the individual rows are concatenated to one another into a line, thereby creating preceding data string B00, B01, B02, ... (FIG. 2C). The data string is divided into 91 bytes of data, followed by 8/16 coding conversion and NRZI conversion. In addition, inherent synchronous pattern S0 is added to the head, thereby forming synchronous frames S0, B'00, B'01, ... (FIG. 2D). B'mn corresponds to coding data for Bmn. Since two synchronous frames hold one row of data in the ECC-configuration matrix, a recording data string is configured in the form of 416 consecutive synchronous frames in all.

Figure 3:
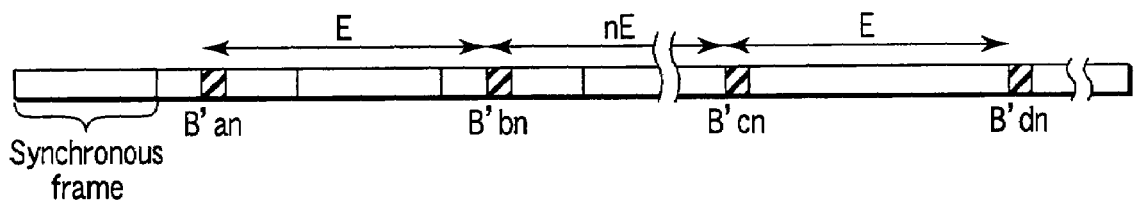
FIG. 3 is an explanatory diagram of a repetitive data part included in the recording data string.

As shown in FIG. 3, it is seen from the recording data string that data bytes B'an, B'bn, ..., B'cn, B'dn, ... belonging to the same column in the ECC-configuration matrix are arranged at regular intervals of E equivalent to two synchronous frame lengths.

Figure 4:
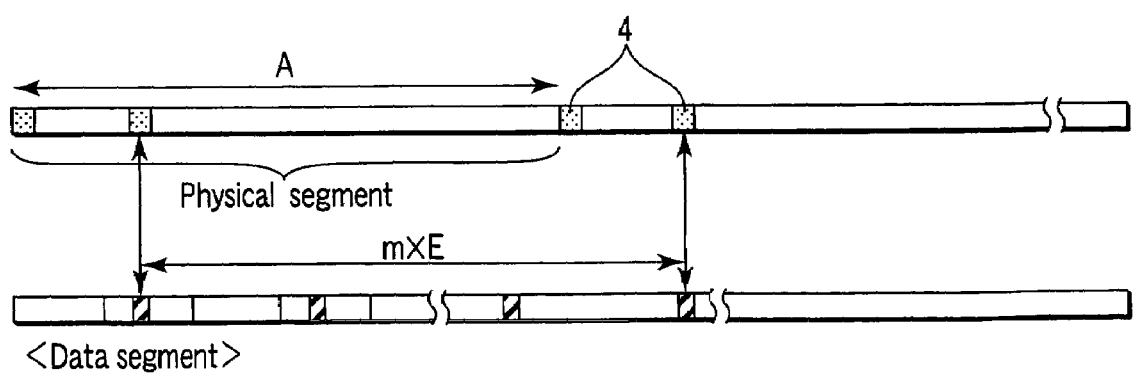
FIG. 4 is a diagram to help explain the relationship between the repetitive data part included in the recording data string and the physical segment of the optical disk.

When such a recording data string is recorded into the aforementioned physical segment, the positional relationship is as shown in FIG. 4.

In the physical segment, format information 4 is placed in a specific position. When wobbles are used, a format modulation section modulated according to the format data is formed on the track. In the part excluding the format modulation section, a recording track groove is made with a wobble structure of a constant period. The modulation section, however, requires track grooves with discontinuous phases or periods, in order to include an address information. As the result, the noise level is liable to become higher in forming a substrate.

When a recording data string is recorded in such a physical segment, the equation A=52E holds in the +R format, that is, A is an integral multiple of E. And A is a length of the physical segment area, and E is a total length of two synchronous frames.

As described above, in the recording data string, highly correlated data items are arranged at specific intervals. In the physical segment, too, format modulation sections (e.g., address information) are present at specific intervals. If one of the two specific intervals is an integral multiple of the other, the data belonging to the columns in the ECC matrix is superimposed on the format modulation section.

For example, as shown in FIG. 5, in such a structure as provides a format modulation section by forming the reversed phase in the walls on both sides wobbled in phase with each other, the recorded data in the part is influenced by a fluctuation in the reflectivity due to a variation in the groove width, resulting in a fluctuation in the envelope of the reproduced signal, which degrades the error characteristic. When recording was done with a density three times as high as DVD, measurements showed that an error rate of $10^{-6}$ was degraded to $10^{-5}$.

To overcome this problem, an ECC matrix is configured from the original data string shown in FIG. 3 and a recording data string composed of synchronous frames is used. The length A of the physical segment area is determined by the number of synchronous frames. In the present invention, attention is given to the fact that, if an odd number of physical segments can be set in a recording data string, the physical segments can be easily prevented from being divided by E.

In an example of DVD, a recording data string is factorized into prime factors as follows: 416=2×2×2×2×2×13. Therefore, in the prime factors, an odd number is 13 alone. With the value of 13, the length of one physical segment is too short and therefore it is difficult to superimpose format information without affecting the recording data.

To overcome this shortcoming, a suitably small number of additional synchronous frames are added to a recording data string to create a data segment string, thereby forming the minimum unit of recording in the present invention. In the additional synchronous frames, suitable format information may be recorded or totally dummy data may be recorded.

For example, it follows that 416+1=417=3×139. As a result, a recording block string can be recorded into three physical segments. The physical segment length A contains 139 synchronous frames.

With this arrangement, the relationship between the physical segment and the data segment string is realized as shown in FIG. 6.

The physical segment has format modulation sections 4. Even when a modulation section is superimposed on, for example, B'an in the recording data in the first physical segment (the part shown by arrow A1), since A cannot be divided by E=2 in the following physical segment, B'dn can be caused to come off the format modulation section (the part shown by arrow A2).

B'an and B'dn, which are synchronous frames arranged in the column direction in the ECC-configuration matrix, correlate with each other highly.

With the above-described arrangement, the probability that errors will occur in the elements in a single column in the ECC-configuration matrix can be decreased, which enables stable recording and reproducing.

In the explanation, as shown in FIG. 2, one ECC-configuration matrix has been converted into one recording data string, which has been then recorded. In the present invention, two recording data strings may be used to improve the error correcting capability (ECC resistance) for high density recording. In this case, two recording data strings are mixed alternately in units of an integral multiple of synchronous frames to create a format using recording data strings of a double length. In this format, too, the idea of the present invention is applicable. The interval E between data items belonging to the same column is E=2 or E=4.

For example, if 416×2=832 in the number of synchronous frames is a recording data string, one additional synchronous frame is added to the recording data string. Then, the resulting value 833 is determined to be a data segment. It follows that 833=7×7×17. Thus, a data segment can be composed of seven physical segments. With A=119, a configuration that cannot be divided by E=2 or E=4 can be realized.

With this configuration, a decrease in the format efficiency due to an additional synchronous frame is as small as 1÷833=0.12%. Therefore, the structure can be used sufficiently as a recording data structure for reproduction-only optical disks.

The data segment string including an additional frame shown in FIG. 6 may be used directly as a unit of recording. Moreover, when a plurality of data segment strings are written one after another in a concatenating manner, they may be concatenated in an additional synchronous frame acting as a dummy data string.

FIG. 7 shows a structure in such a case. In recording data composed of a plurality of data segment strings, a head additional synchronous frame (may be referred to as a guard area) shorter than the synchronous frame length is placed at the head. The additional synchronous frame length between consecutive data segment strings is left as it is. At the last part of the recording, an end additional synchronous frame shorter than the synchronous frame is added.

When writing is done in a concatenating manner as described above, even if a slight shift in the recording position takes place, only the dummy data cannot be read and no effect is exerted on the reproduction of the data in the original recording data strings.

The length obtained by adding the begin additional synchronous frame and the end additional synchronous frame may be made a little longer than the synchronous frame as shown in FIG. 7 to form such a relationship between the recorded data and the additional recording data. Having overlapped parts prevents openings from occurring as a result of a shift in the recording position. In addition, in a rewritable medium, such as a phase-change medium, the recording start position is shifted back and forth at random to increase the resistance to repetition, a length larger than an expected amount of shift may be superimposed.

The essence of this invention is that the format modulation sections and the ECC-configuration data are prevented from standing side by side. If the proportion of format modulation sections increases, the possibility that the data in the same column in the ECC matrix will lie on top of a format modulation section in another place in the physical segment increases.

To avoid this problem, the limitation of the proportion of the length of the format modulation sections in the physical segment is effective. As explained in FIG. 5, the modulation sections might cause a deterioration of about one decimal place in a data reproduction error rate in the worst case. Up to what error rate deterioration is permitted depends on the design of the apparatus. About two to three times that of the normal error rate is a reasonable design value.

If the length of a format modulation section is 20%, an increase in the number of errors is 0.8+0.2×10=2.8, an appropriated value a little under three times.

The shorter the length of the format modulation section, the less the effect on data reproduction becomes. Since the format modulation section is too short, it cannot contain the necessary format information. Therefore, a length about 10% to 20% in the physical segment is an appropriate design range. The format modulation sections may be provided in such manner that they are concentrated at the head of the physical segments. They may also be provided in such manner that they are distributed suitably.

While in the explanation, a CLV-configuration optical disk with a constant recording density has been assumed, the present invention may be applied to an optical disk with such a configuration as allows the angular rotational velocity to be constant in a certain radius range as a constant angular velocity (CAV) or a zone CAV.

Figure 8:
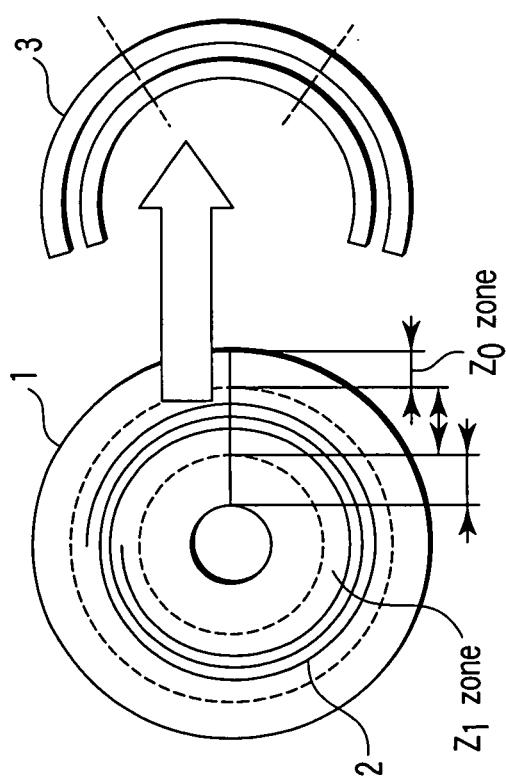
FIG. 8 is a diagram showing an example of an optical disk with a zone CAV configuration.

FIG. 8 shows a zone CAV configuration. The inside of the optical disk 1 is divided into a plurality of zones Z0, Z1, . . . . In a recording track 2 in a single zone, a physical segment 3 is aligned radially as shown in FIG. 8. In this case, if a prospect angle to the center of the optical disk is a unit of length, the foregoing discussion about the length can be applied directly. For example, the inner side and outer side in the same zone differ in the physical length along the recording track direction of the physical segment. However, since the prospect angle to the center is the same, the physical segments can be considered to have the same length. Here, the prospect angle means the angle defined by two radial line segments passing through the center of the disk.

Therefore, use of an additional-synchronous-frame-added recording block string and the structuring of a data segment string from an odd number of physical segments are also effective.

The zone CAV is an effective format for a land-groove recording optical disk capable of permitting the land part between track grooves to be used as a recording track. This is because groove wobbles can be used directly as land wobble data.

Figure 9:
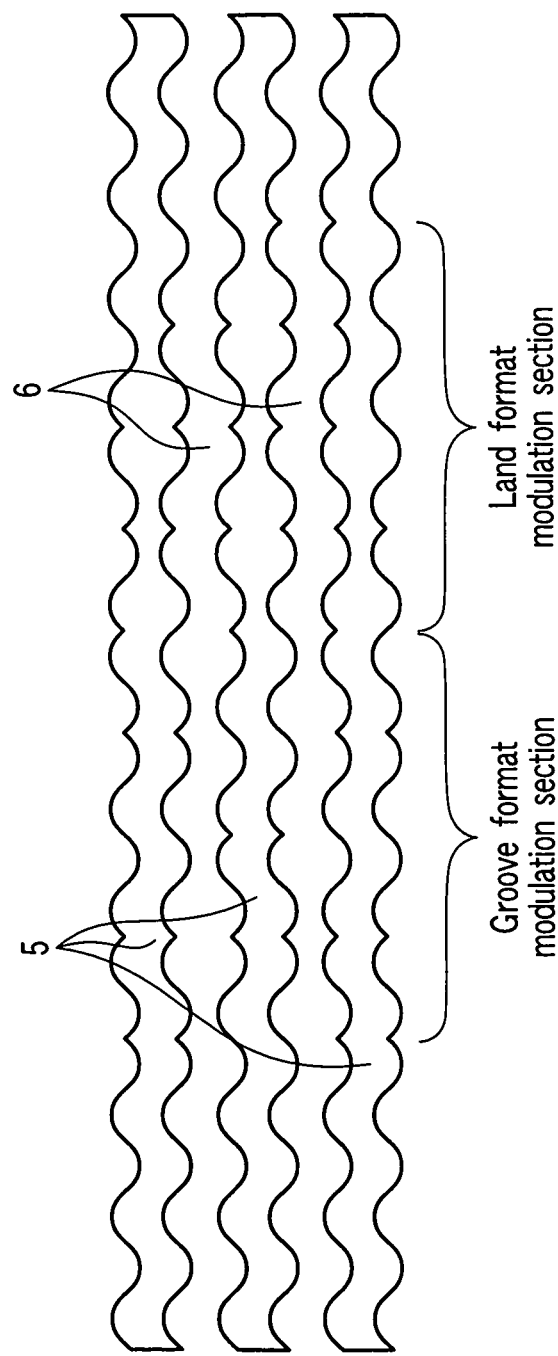
FIG. 9 is an explanatory diagram of a format configuration of a land-groove optical disk.

FIG. 9 shows a format structure of such a land-groove optical disk, particularly an example of the part corresponding to the format modulation section in the physical segment area.

The groove format modulation section is so formed that the walls on both sides make an in-phase change with respect to a groove recording track 5. The groove format modulation section can reproduce format data from the grooves in wobble modulation. The land format modulation section is so formed that the walls on both sides make an in-phase change with respect to a land recording track 6. The land format modulation section can reproduce format data from the lands in wobble modulation. In such a modulation configuration, parts where the groove walls on both sides make a reverse-phase change develop in the land recording track 6 of the groove format maculation section and the groove recording track 5 of the land format modulation section.

In such parts, since the error rate is liable to decrease in reproducing the data recorded in a superimposed manner, the physical segment arrangement of the invention as shown in FIG. 6 functions effectively.

FIG. 10 is an embodiment of an optical disk apparatus used in the present invention. Data is recorded onto or reproduced from an optical disk 1 on a spindle 10 by an optical head 11. Parity is added to the original data at an ECC configuration circuit 15. A data segment string creating circuit 16 adds an additional synchronous frame to the parity-added data to create a recording data string and sends the string to the optical head 11. The data segment string creating circuit 16 also selects additional synchronous frames for the beginning and end of recording suitably.

A format detecting circuit 12 takes the reproduced data from the optical disk 11 out of the physical segments. A data reproducing circuit 13 performs error correction, thereby reproducing the original data.

The above explanation has been given about a medium in which physical segments have been recorded as a preformat as an additional recording optical disk medium or a rewritable optical disk medium.

Even in a ROM-type medium where a format compatible with an additional-writing medium is desirable, the recording data format can be introduced without a large decrease in the format efficiency. In the case of a ROM-type medium, since the optical disk itself has no format modulation section, the deterioration of data does not become a problem directly. However, use of the configuration of the present invention to maintain the compatibility with an additional-writing medium is effective in configuring an optical disk apparatus at low cost.

According to the present invention, it is possible to realize an optical disk medium and an optical disk apparatus which enable effective data recording even in high-density recording.

As described above, the present invention is basically as follows: in an optical disk medium with a spiral recording track divided into physical segments of a specific length each of which has a preformat modulation section formed in a specific position of the segment, an original data string of a specific length is divided into blocks, thereby creating error correction codes and adding the codes. In addition, coding data items in data contributing to the creation of the same error correction code are arranged at regular intervals of E in a recording data string composed of a plurality of synchronous frames having a fixed-number of data items converted into synchronous data and coding data at the head of each block. A recording data length L obtained by adding an additional synchronous frame to the recording data string and a physical segment length A satisfy the equation L=mA where m is a natural number and A is indivisible by E.

In another optical disk according to the present invention, a recording track wobbles at a specific single frequency. In the preformat modulation section, the wobbling is modulated. The proportion of the preformat modulation sections in a physical segment may be 20% or less.

Furthermore, another optical disk medium according to the present invention is so configured that the recording start position and recording end position of data lie in an additional synchronous frame. Another optical disk medium of the invention is a medium with a CVA configuration or a zone CVA configuration. Physical segments are aligned radially in a single zone. The interval E, data segment length L, and physical segment length A are expressed in units of a protect angle with respect to the center of the disk. Still another optical disk medium of the present invention has a land recording track and a groove recording track and causes the right and left groove walls to wobble in phase with each other. In a part of the preformat modulation section in the physical segment area, the right and left groove walls vary in opposite phase with each other.

An optical disk apparatus of the present invention is an optical disk apparatus which records or reproduces data onto or from an optical disk with a spiral recording track divided into physical segments of a specific length each of which has a preformat modulation section formed in a specific position of the segment. The optical disk apparatus is configured as follows: an original data string of a specific length is divided into blocks, thereby creating error correction codes and adding the codes. In addition, coding data items in data contributing to the creation of the same error correction code are arranged at regular intervals of E in a recording data string composed of a plurality of synchronous frames having a fixed number of data items converted into synchronous data and coding data at the head of each block. A recording data length L obtained by adding an additional synchronous frame to the recording data string and a physical segment length A satisfy the equation L=mA where m is a natural number and A is indivisible by E. In a further optical disk of the invention, the recording start position and recording end position of data lie in an additional synchronous frame. In addition, a reproduction-only optical disk of the invention has a recording data format including the same additional synchronous frame as in the additional-writing optical disk.

Furthermore, in the present invention, the wobble method is realized for a groove-land recording optical disk with an improved recording density, thereby enabling the format information to be detected stably. The concept of the present invention explained below may be combined with the concept of the above explanation and embodied. Alternatively, the concept of the present invention may be embodied independently.

Basically, in an optical disk medium where a groove recording track and a land recording track are arranged alternately to form a spiral recording track, a plurality of zones are provided radially. In a single zone, a recording track is divided into physical segments which are aligned radially and each has a specific prospect angle with respect to the center of the optical disk. A format information recording area is set in a part of each physical segment. The format information recording area is divided into a first area in which format information common to groove recording tracks and land recording tracks is recorded, a second area in which format information inherent to groove recording tracks is recorded, and a third area in which format information inherent to land recording tracks is recorded.

FIG. 11A shows an example of the recording track structure in which the format information has been recorded in wobbles. A groove recording track 1 wobbles periodically. In the wobble modulation section, information is recorded by forming a part with 180° phase-shift wobbles. The wobbles are detected by detecting a push-pull signal obtained from an offset of the distribution of the reflected light in the same manner as detecting track errors. FIG. 11B shows an example of the detected reproduced signal. The reproduced signal corresponding to the wobbles is obtained. In order not to affect the reproduction of the data recorded on the wobbles, a sufficiently long period, several tens of times as long as the data recording period, is used as the period of wobbles.

When the wobble method is used, the recording data area and the format information area can be laid one on top of another, which provides the advantage that the recording data capacity can be made larger.

In the wobble method, the walls on both sides of a recording track are caused to wobble in phase with each other, thereby producing a stable detected output. However, in the land-groove-structure recording tracks, since the wall at the boundary between the land recording track and the groove recording track is shared by both of the recording tracks, when the format information on one of the recording tracks differs from that on the other, modulation cannot be made in the common part.

To overcome this problem, a method of providing two format information areas (address areas) for shifted positions has been proposed. In this method, however, in addition to the two format information areas (address areas), it is necessary to further record a signal for identifying the area to be used (different from the wobble signal). That is, a problem arises when information has been reproduced from the address area from which information was supposed not to be read. The reason is that determination cannot be made as to which is the correct information. This means that an additional detecting means is needed.

In the present invention, a format information recording area is set in a part of each physical segment. The format information recording area is divided into a first area in which format information common to groove recording tracks and land recording tracks is recorded, a second area in which format information inherent to groove recording tracks is recorded, and a third area in which format information inherent to land recording tracks is recorded.

In another optical disk medium of the present invention, the format information recorded in the second and third areas is only address information (track addresses) representing the radial position of each physical segment. In the consecutive physical segments in one circumference, the same address information is recorded.

Furthermore, in the optical disk medium of the invention, the address information recorded in the second and third areas has the Gray code that makes the difference between data items the smallest, between adjacent groove recording tracks or between adjacent land recording tracks. A further optical medium of the invention has a wobble structure that causes the walls on both sides of a groove to wobble. In the areas excluding the format information recording area in the physical segment, the walls on both sides of a groove wobble almost in phase with each other in a period with a specific prospect angle in the same zone in both of the groove recording track and land recording track. In a first area, the optical disk medium has a wobble structure that causes the walls on both sides to be modulated almost in phase with each other according to the format information in both of the groove recording track and land recording track. In a second area, the optical disk medium has a wobble structure that causes the walls on both sides of a groove recording track to be modulated almost in phase with each other according to the format information. In a third area, the optical disk medium has a wobble structure that causes the walls on both sides of a land recording track to be modulated almost in phase with each other according to the format information.

In another optical disk medium of the invention, the format information recording area is divided into a plurality of subformat information recording areas, which are distributed in the physical segment. The length of each subformat information recording area is equal to or less than 20 times the period of the wobbling of the wobble structure in the areas excluding the format information recording area.

With a recording and reproducing apparatus of the present invention, when data is recorded onto or reproduced from an optical disk medium, or when data is recorded onto or reproduced from a groove recording track, the format information in the first and second areas is used. When data is recorded onto or reproduced from a land recording track, the format information in the first and third areas is used. Furthermore, in an optical disk recording and reproducing apparatus of the invention, an optical disk medium has a wobble structure that causes the walls on both sides of a groove to wobble. The format information recording area is divided into a plurality of subformat information recording areas, which are distributed in a physical segment. The length of each subformat information recording area is less than 20 times the period of the wobbling of the wobble structure in the areas excluding the format information recording area. The optical disk recording and reproducing apparatus has a circuit that detects the period of the wobbling of the wobble structure and generates a synchronous clock when recoding data onto or reproducing data from the optical disk medium. The apparatus does not use the detected signal from the format information recording area as an input to the clock generating circuit.

As shown in FIG. 8, the optical disk 1 with the zone structure used in the present invention is divided into a plurality of zones Z0, Z1, . . . in the radial direction. The spiral recording track 2 in the zones is composed of land recoding tracks and groove recording tracks. In the same zone, physical segments 3 are aligned radially as shown at right in FIG. 8.

When physical segments are arranged in this way, one method of representing the addresses for individual physical segments is to allocate unique numbers to the individual physical segments. In this case, it is necessary to completely divide the address writing area for the land recording tracks from that for the groove recording tracks. Thus, it is necessary to secure twice the area for recording the format information in each physical segment.

In the invention, a method of representing an address for a physical segment is to configure physical segments adjoining radially in the same zone so as to have as many pieces of common format information as possible, taking a combination of several notations into account. For example, the zone numbers and the segment numbers in the circumferential direction are given as common address information. Only the position address information in the radial direction is given as inherent format information to each of the grove recording tracks and land recording tracks. By doing this, the amount of information inherent to each recording track can be reduced remarkably.

FIG. 12 shows a physical segment configured as described above. A groove recording track 5 and a land recording track 6 are arranged alternately, thereby configuring physical segments aligned radially.

Since they are arc-like physical segments 3 as shown in FIG. 8 on an actual optical disk medium, the physical length on the inner side of the zone differs from that on the outer side. However, the prospect angle with respect to the center of the optical disk is always constant. Therefore, the prospect angle is read as the length and a physical segment is expressed by the same length in the explanation and figures below for convenience's sake.

In the physical segment 3, a first area 7 in which format information common to physical segments adjoining radially is recorded, a second area 8 in which information inherent to groove recording tracks is written, and a third area 9 in which information on land recording tracks are arranged so as to align radially.

While in FIG. 8, each area is provided as a continuous area, it may be divided into subformat information recording areas, which may then be distributed in a plurality of places. The order in which the individual areas are arranged may be changed. For instance, the first area may be provided last in the order.

The format information recorded in the second and third areas can be limited to addresses representing positions in the radial direction by the way addresses are allocated. In this case, the physical segments in one circumference of a spiral recording track can have the same address information. Therefore, a plurality of consecutive physical segments in the track direction can have the same information. In such a case, since the information in the second and third areas can be determined by the result of detecting a plurality of physical segments, the necessary detecting capability can be assured without adding additional information, such as parity, to the format information in each area.

On the other hand, since the information in the first area 7 includes information on positions in the circumferential direction, it differs from one physical segment to an adjacent one in the track direction. Therefore, to assure the reliability of detection, it is desirable that error detecting information, such as parity, should be added.

As described above, even when the amount of information in the second area 8 and the third area 9 is limited, the third area 9 viewed from the groove recording track and the second area 8 viewed from the land recording track are areas where the information about a right adjacent recording track differs from the information about a left adjacent recording track. In such areas, the detected output becomes unstable in detecting the format information. Therefore, it is undesirable that they should be too long.

To reduce the difference between the two pieces of information, the Gray code as shown in FIG. 13 may be used as means for writing the address information.

Unlike ordinary binary code, the Gray code is characterized in that the number of differences in element between adjacent codes is limited to one. Use of such codes enables a part where the information differs from a recording track to an adjacent one to be limited to a much narrower part of the area.

FIG. 14 shows an example of the format information written using wobble phase modulation.

A groove recording track 5 and a land recording track 6 are arranged alternately, thereby forming a first area, a second area, and a third area for recording the format information by phase modulation in such a manner that they are aligned in the radial direction. The second and third areas are further divided into a plurality of sub-areas.

In the areas excluding the three areas, all of the groove walls wobble in the same period and phase. In the first area, while the information is recorded by phase inversion, all of the groove walls vary in phase with one another in the radial direction. In the second area, the walls on both sides viewed from the groove recording track are formed so as to vary in phase with each other. In the third area, the walls on both sides viewed from the land recording track are formed so as to vary in phase with each other.

When data is recorded onto or reproduced from the groove recording track, the format information is obtained from the first and second areas. When data is recorded onto or reproduced from the land recording track, the format information is obtained from the first and third areas. Whether the light spot from the optical disk recording and reproducing apparatus lies on the land or the groove can be determined easily from the polarity of the push-pull signal detected for tracking servo from the groove. Therefore, it is not necessary to provide a special identification mark on each recording track.

One method of manufacturing an original recording of an optical disk substrate with such a wobble structure is to use two cutting beams overlapping partially with each other in the radial direction in making a groove, thereby causing the right and left walls to be modulated independently. A part where the walls wobble in phase with each other and a part where the walls wobble in opposite phase with each other can be formed easily.

Another method is to manufacture the original recording with only one cutting beam by forming an in-phase part by wobbling the cutting beam right to left and an opposite-phase part by changing the intensity of the beam to modulate the width of the groove. The opposite phase part is necessary to form the third area. Because of the wobbling of the beam and a variation in the intensity of the beam, it is difficult to realize the amplitude of the identical wall. Even if the amplitude of the wall is half the wobble, when the amplitude is realized by the modulation of the groove width, it is sufficiently possible to detect a wobble signal.

When the Gray code is used as information to be recorded, the part where the bit information in certain data differs from that in the preceding or following data lies in a different digit. For instance, the code before the code 000011 is 000001 resulting from the second digit from the left being changed. Thus, a groove made between the two digits is subjected to groove width modulation in the second digit position. On the other hand, since the next code is 000010 and therefore the second digit remains unchanged, a groove made between the two digits has a normal wobble structure. This is characteristic of use of the Gray code.

Specifically, only a groove between parts differing in bit information is modulated in opposite phase. The opposite side from the land recoding track side is always subjected to in-phase groove modulation. Thus, even if a groove has an opposite-phase modulation amplitude of zero and is straight without the wobbling of the wall, the wobble signal can be detected from the wobbling of the wall on the opposite side. At this time, although the signal amplitude is halved, securing a sufficient S/N margin for the signal enables the wobble signal to be detected.

FIG. 15A shows the arrangement near the second area of the format information created from wobbles and detected reproduced signals from wobbles. In the recording track, the second area has been formed. Under FIG. 15A, a signal waveform (FIG. 15B) reproduced from a groove recording track 5 and a signal waveform (FIG. 15C) reproduced from a land recording track 6 in the middle are shown. It can be understood from the Figures that, when the walls on both sides vary in opposite phase with each other, the amplitude of the reproduced signal becomes zero. Similarly, in the third area, such a phenomenon takes place on the groove recording track side.

Although not reproducing the format information from the part with no amplitude, the recording and reproducing apparatus generates a clock synchronizing with the waveform of a single-period part from the wobble reproduced signal and produces the timing necessary for various operations. Therefore, if areas without no amplitude continue over a long period, it is difficult to generate a synchronous clock. Even if the amplitude is not zero, when modulation is applied, the detected signal is liable to be unstable in a discontinuous part of the phase, which is undesirable in detecting the synchronous clock stably.

Whether a stable synchronous clock can be generated however long the modulation area continues depends on the circuit design. Since the clock becomes the original clock for a recording operation, the permitted limit of the fluctuated frequency is about 2%. If the wobble reproduced signal disappears in a state where there is a 2% shift in the period, the totality will amount to a 40% phase shift after 20 periods. Although a synchronous clock generating circuit detects a phase shift in the generated clock for the reproduced signal and corrects the generated clock, phase pull-in control can be performed up to a range of ±50%. Thus, when taking a margin into account, it is desirable that the length of the modulated part should be limited to 20 periods or less.

When the necessary format information is equal to or longer than this length, the format information area is divided into a plurality of subformat information recording areas as described earlier. Then, the subformat information recording areas are arranged in a distributed manner, which eliminates a problem encountered in generating a synchronous clock.

While in the above explanation, format information recording has been done by a phase modulation base on 180°, the modulation method is not limited to this. For instance, phase modulation with a phase difference of 180° or less or frequency modulation may be used. The binary data information, 1, 0,in the format may be subjected to NRZ modulation or suitable coding conversion, such as bi-phase. In addition, while in the embodiment, phase modulation has been performed at intervals of one period of wobbling, it may be performed at intervals of several periods, thereby improving the reliability.

Furthermore, when the subformat information recording areas are recorded in a distribute manner, a special pattern different from the data pattern may be placed at the head, thereby making it easier to identify the recording area. Of course, it is desirable that an inherent pattern not used as data should be embedded in a part of the first area to indicate the head position of the physical segment itself. A pattern different from the inherent pattern is used.

FIG. 16 shows an embodiment of the recording and reproducing apparatus according to the present invention. An optical disk 1 is set on a spindle 10. An optical head 11 records or reproduces the data or reproduces the format information. In the operation of reproducing the format information, a wobble synchronous clock generating circuit 17 generates a synchronous clock for reading wobble modulation from the detected wobble reproduced signal. On the basis of the clock and the information obtained from a land-groove decision circuit 18, a format detecting circuit 19 detects the format information on the recording track. The format detecting circuit 19 detects the format information from the first and second areas when the recording track is a groove and from the first an third areas when the recording track is a land.

The wobble synchronous clock generating circuit 17 can also recognize the format information recording area from the information obtained from the format detecting circuit 19 and cut off the input of the clock generating circuit, thereby improving the stability of the clock further.

As described above, the format information is divided into the information common to the land grooves and the information inherent to each land groove. The inherent information is minimized and recorded separately. Since only the inherent information part for the other recording tracks is an undetectable area, stable format detection can be realized. As a result, it is possible to provide an optical disk medium and a recording and reproducing apparatus for the optical disk medium which enable the format information to be detected stably with a high recoding density in a land-groove optical disk.

As described above, in the present invention, attention has been given to the relationship between the format modulation sections and the physical segments. To read the information in the format modulation sections accurately and stably, the configuration of a disk has been contrived. Another embodiment of the present invention is possible. In the embodiment explained below, a format modulation section between adjacent recording tracks is prevented from being arranged linearly in the radial direction.

The present invention is effective when applied to a reproduction-only information recording medium (next-generation ROM), an additional-writing information recording medium (next-generation R), and a rewritable information recording medium (next-generation RAM). The characteristics of the present invention will be explained in detail. In the invention, a guard area is added to an ECC block and the total area is divided into seven segments, which are then recorded.

<Explanation of ECC Block>

As shown in FIG. 17, data recorded in the data field of an information recording medium is referred to as a data frame, a scrambled frame, and a recording frame or recorded data field according to the signal processing stages. The data frame, which contains 2048 bytes, has main data, a 4-byte data ID, a 2-byte ID error detection code (IED), 6-byte reserved bytes, and a 4-byte error detection code (EDC).

After the error detection code (EDC) is added, the main data is scrambled. Then, the Cross Reed-Solomon error correction code is applied to 32 scrambled data frames (scrambled frames), thereby performing a so-called ECC encoding process. By this process, a recording frame is configured. The recording frame includes the Parity of Outer-code (PO) and the Parity of Inner-code (PI).

The PO and PI are error correction codes created for each ECC block composed of 32 scrambled frames.

The recording frame is subjected to 8/12 modulation. In the modulated field, a synchronous code (SYNC) is added to each head at intervals of 91 bytes, thereby forming recording data field. In a single data field, four kind of synchronous code are recorded.

FIG. 17 shows the way the data changes from the main data to recording frames. FIG. 18 shows the form of a data frame. The data frame, which contains 2064 bytes (172 bytes×2×6 rows), includes 2048-byte main data.

FIG. 19 shows a data ID. The data ID contains 4 bytes. The first one byte in bits b31 to b24 is data field information and three bytes (bits b23 to b0) are allocated to a data field number.

The data field information in an embossed data zone includes the following pieces of information: a sector format type, a tracking method, reflectivity, a recording type, a data type, and a layer number.

When the sector format type is 1b, this means a zone format type; when the tracking method is 0b, this means pit tracking; when the reflectivity is 1b, this means 40% or less; when the recording type is 0b, this means general, and when it is 1b, this means real-time information (the defect control method for 0b differs from that for 1b); when the area type is 01b, this means a lead-in area; when the data type is 0b, this means read-only data; and when the layer number is 0b, this means layer 0 in a dual layer or a single-layer disk, and when it is 1b, this means layer 1 in a dual layer.

The data field in a rewritable data zone is as follows: when the sector format type is 1b, this means a zone format type; when the tracking method is 1b, this means groove tracking; when the reflectivity is 1b, this means 40% or less; when the recording type is 0b, this means general, and when it is 1b, this means real-time information (the defect control method for 0b differs from that for 1b); when the area type is 00b, this means a data area, when it is 01b, this means a lead-in area, and when it is 10b, this means a lead-out area; when the data type is 1b, this means rewritable data; when the layer number is 0b, this means layer 0 in a dual layer or a single-layer disk, and when it is 1b, this means layer 1 in a dual layer. These bits must be allocated according to the above-described rule.

Next, the error detection code (IED) for data ID will be explained.

If the individual bytes arranged in a matrix are $C_{i,j}$ (i=0 to 11, j=0 to 171) and the individual bytes for IED are $C_{0,j}$ (j=0 to 4), IED is expressed as:

$$IED(X) = \sum_{j=4}^{5} C_{0,j} \cdot X^{5-j}$$
$$= \{I(X) \cdot X^2\} \bmod \{G_E(X)\}$$

Here, $$I(X) = \sum_{j=0}^{3} C_{0,j} \cdot X^{3-j}$$

$$G_E(X) = \prod_{k=0}^{1} (X + \alpha^k)$$

where $\alpha$ represents the primitive root of the primitive polynomial.

$$P(X) = x^8 + x^4 + x^3 + x^2 + 1$$

Next, the 6-byte RSV will be explained.

The first byte in RSV is used as initial information or a species for scrambling. The remaining five bytes are 0h, meaning reserved.

The error detection code (EDC), which is a 4-byte check code, accompanies 2060 byte in the data frame before scrambling. If the MSB of the first byte in the data ID is b16511 and the LSB of the last byte is b0, then each bit bi (i=31 to 0) for EDC is expressed as:

$$EDC(x) = \sum_{i=31}^{0} b_i x^i$$
$$= I(x) \bmod \{g(x)\}$$

Here, $$I(x) = \sum_{i=16511}^{32} b_i x^i$$

$$g(x) = x^{32} + x^{31} + x^4 + 1$$

FIG. 20A shows an example of initial values to be given to a feedback shift register in creating a scrambled frame. FIG. 20B shows a feedback shift register for creating scrambled bytes. Sixteen kinds of preset values are prepared. r7 (MSB) to r0 (LSB), which are shifted in units of eight bits, are used as a scrambled byte. The initial preset number in FIG. 20A is equal to four bits (b7 (MSB) to b4 (LSB)) in the data ID. When the scrambling of the data frame is started, the initial values for r14 to r0 must be set in the initial preset values in the table of FIG. 20A.

The same initial preset value is used for 16 consecutive data frames. Then, the initial present values are changed. The changed present value is used for 16 consecutive data frames.

The lower eight bits in the initial values r7 to r0 are taken out as scrambled byte S0. Thereafter, a shift of eight bits is performed. Then, the scrambled byte is taken out. Such an operation is repeated 2047 times. When scrambled bytes S0 to S2047 are taken out from r7 to r0, the data frame changes from the main byte Dk to the scrambled byte D'k. The scrambled byte D'k is expressed as:

D'k=Dk□Sk for k=0 to 2047□ means Exclusive-OR logical operation.

Next, the configuration of an ECC block will be explained.

Figure 21:
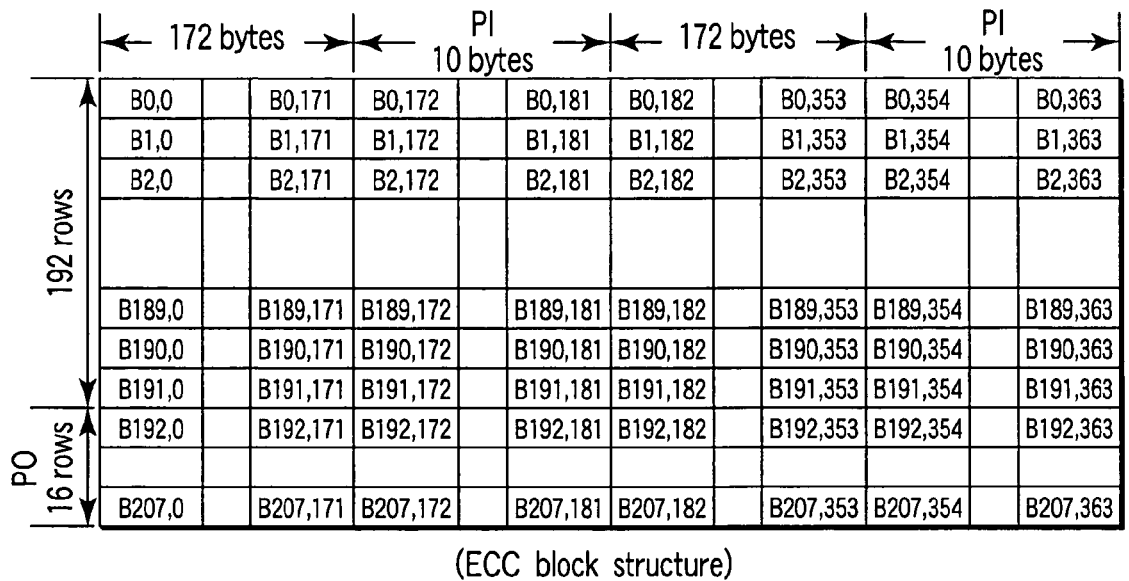
FIG. 21 shows an ECC block composed of 32 consecutive frames.

FIG. 21 shows an EEC block. The EEC block is composed of 32 consecutive scrambled frames. In the block, 192 rows+16 rows are arranged in the vertical direction and (172+10)×2 columns are arranged in the horizontal direction. Each of B0, 0, B1, 0, . . . is one byte. PO and PI, which are error correction codes, are the Parity of Outer-code and the Parity of Inner-code, respectively.

Figure 22:
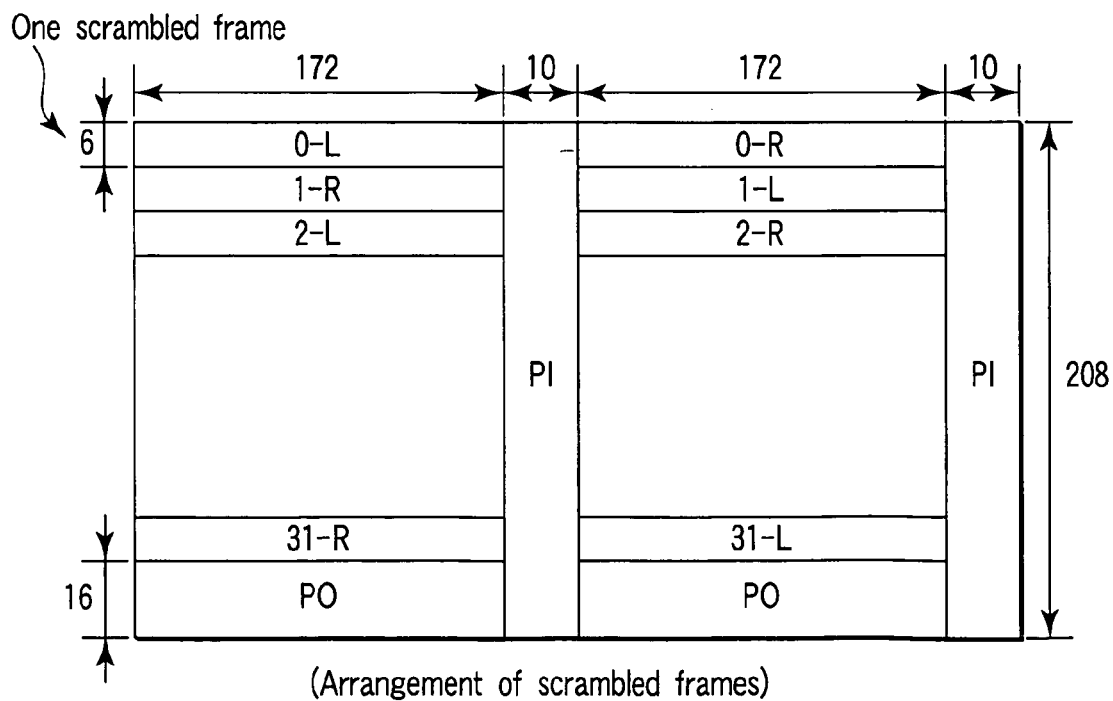
FIG. 22 shows a scrambled frame arrangement of the ECC blocks in FIG. 21.

In the ECC block of FIG. 21, a unit of 6 rows×172 bytes is treated as a scrambled frame. FIG. 22 shows what is obtained by rewriting the ECC block as a scrambled frame arrangement. That is, the ECC block is composed of 32 consecutive scrambled frames. In this system, (block 182 bytes×207 bytes) are treated as a pair. When L is attached to the number of each scrambled frame in the left-side ECC block and R is attached to the number of each scrambled frame in the right-side ECC block, the scrambled frames are arranged as shown in FIG. 22. That is, in the left-side block, a left scrambled frame and a right scrambled frame exist alternately. In addition, in the right-side block, a right scrambled frame and a left scrambled frame exist alternately.

Specifically, the ECC block is composed of 32 consecutive scrambled frames. The individual rows in the left half of an odd-numbered sector are replaced with the rows in the right half. 172×2 bytes×192 rows, which are equivalent to 172 bytes×12 rows×32 scrambled frames, makes an information field. A 16-byte PO is added to each of 172×2 columns to form outer codes for RS (208, 192, 17). In addition, a 10-byte PI (RS (182, 172, 11)) is added to each of 208×2 rows in each of the right and left blocks. PI is also added to the rows in PO.

The number in a frame indicates a scrambled frame number. The suffixes R and L mean the right half and left half of a scrambled frame. PO and PI shown in FIG. 21 are created in the procedure below.

First, 16-byte $B_{i,j}$ (i=192 to 207) are added to column j (j=0 to 171 and j=182 to 353). $B_{i,j}$ is defined by the following polynomial Rj(X).

The polynomial is for converting outer code RS (208, 192, 17) into 172×2 columns.

$$R_j(X) = \sum_{i=192}^{207} B_{i,j} \cdot X^{207-i}$$

-continued $$= \{I_j(X) \cdot X^{16}\} \bmod \{G_{PO}(X)\}$$

Here, $$I_{j,k}(X) = \sum_{i=0}^{191} B_{m,n} \cdot X^{191-i}$$

$$G_{PO}(X) = \prod_{k=0}^{15} (X + \alpha^k)$$

Next, 10-byte Bi,j (j=172 to 181 and j=354 to 363) is added to row i (i=0 to 207). The Bi,j is defined by the following polynomial Ri(X).

The polynomial is for converting inner code RS (182, 172, 11) into (208×2)/2 rows.

(For j = 172 to 181)

$$R_i(X) = \sum_{j=172}^{181} B_{i,j} \cdot X^{181-j}$$

$$= \{I_i(X) \cdot X^{10}\} \bmod \{G_{PI}(X)\}$$

Here, $$I_i(X) = \sum_{j=0}^{171} B_{i,j} \cdot X^{171-j}$$

$$G_{PI}(X) = \prod_{k=0}^{9} (X + \alpha^k)$$

(For j = 354 to 363)

$$R_i(X) = \sum_{j=354}^{363} B_{i,j} \cdot X^{363-j}$$

$$= \{I_i(X) \cdot X^{10}\} \bmod \{G_{PI}(X)\}$$

Here, $$I_i(X) = \sum_{j=182}^{353} B_{i,j} \cdot X^{353-j}$$

$$G_{PI}(X) = \prod_{k=0}^{9} (X + \alpha^k)$$

where α represents the primitive roof of the primitive polynomial.

$$P(X) = x^8 + x^4 + x^3 + x^2 + 1$$

Bi,j, an element in each B matrix of FIG. 21, constitutes 208 rows×182×2 columns. The B matrix is interleaved between rows so that Bi,j may be rearranged at Bm,n. The interleaving rule is expressed by the following equation:

$$m = i \lfloor (i+6)/12 \rfloor * \; n = j \; [\text{when } i \leq 191, j \leq 181]$$

$$m = (i-191) \times 13 - 7 \; n = j \; [\text{when } i \geq 192, j \leq 181]$$

$$m = i + \lfloor i/12 \rfloor * \; n = j \; [\text{when } i \leq 191, j \geq 182]$$

$$m = (i-191) \times 13 - 1 \; n = j \; [\text{when } i \geq 192, j \geq 181] * \lfloor p \rfloor$$

means the maximum integer not larger than p.

Figure 23:
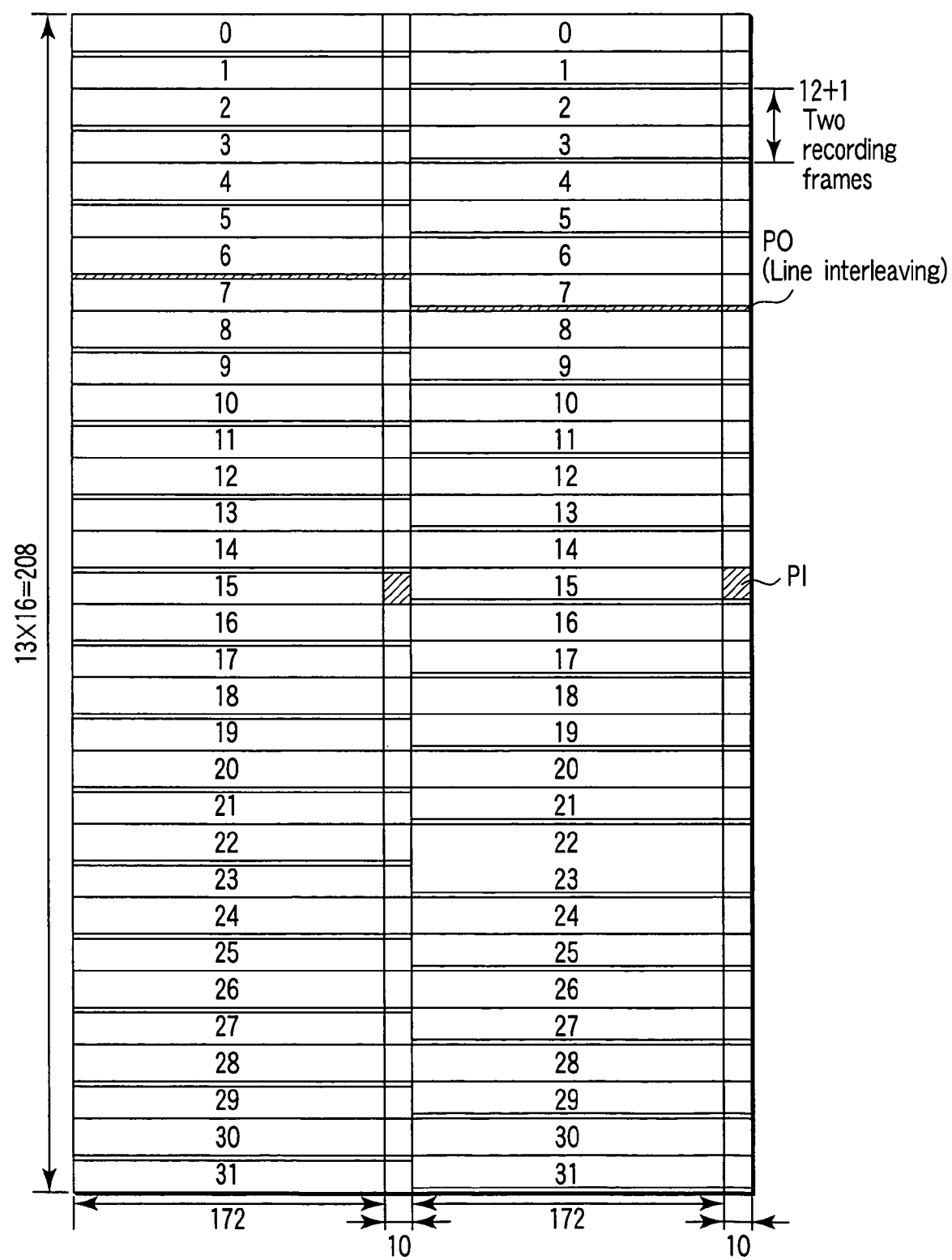
FIG. 23 is an explanatory diagram of 16 parity rows distributed in an ECC block.

As a result, as shown in FIG. 23, 16 parity rows are distributed one by one. That is, 16 parity rows are arranged in such a manner that one row is allocated to every two recording frames. Therefore, a recording frame composed of 12 rows results in 12 rows+one row. After row interleaving is done, 13 rows×182 bytes are referred to as a recording frame. Thus, after the row interleaving is done, the ECC block has 32 recording frames. In a recording frame, there are six rows in each of the right-side block and the left-side block as shown in FIG. 22. PO is arranged in such a manner that the row in the left block (182×208 bytes) in which PO lies differs from that in the right block (182×208 bytes). In FIG. 23, one self-contained ECC block is shown. In an actual data reproduction, such an ECC block arrives at an error correcting section one after another successively. To increase the correcting capability of the error correcting process, an interleaving method as shown in FIG. 23 is used.

Next, the configuration of the recording data field will be explained.

Figure 24A:
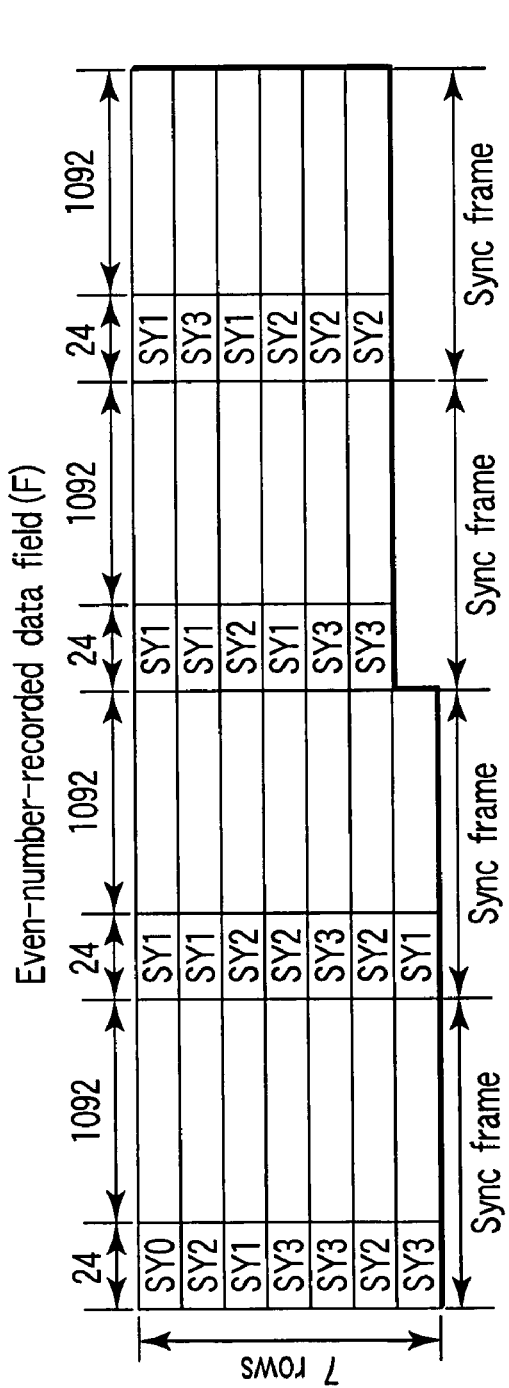
FIGS. 24A and 24B are explanatory diagrams to help explain the way the data in the ECC block is modulated and synchronous codes are added to the modulated data to produce a recording data field.
Figure 24B:
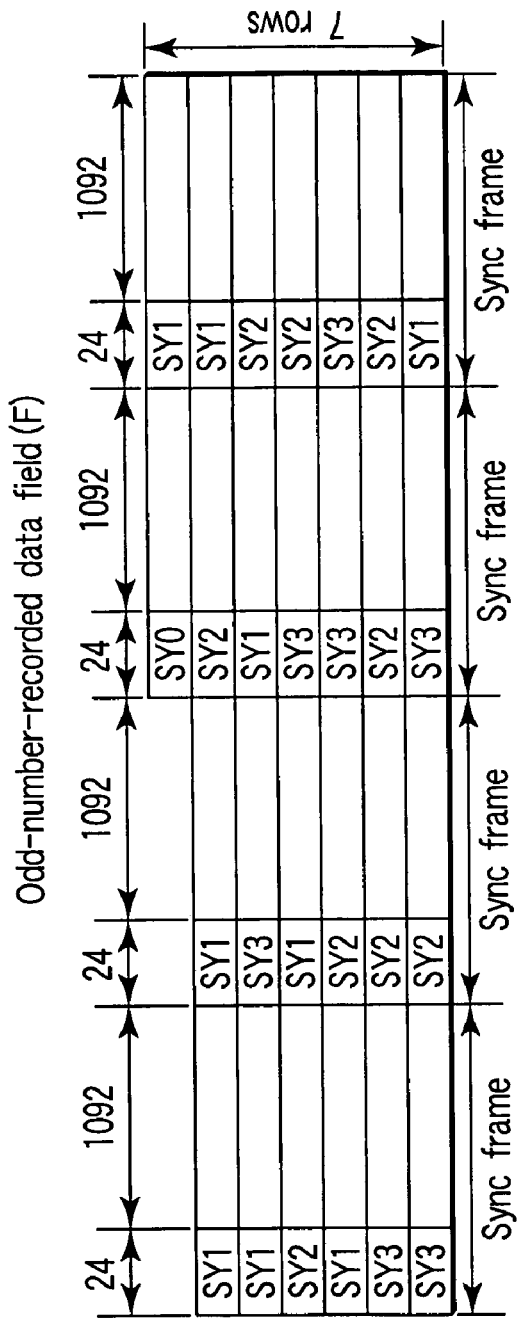

A recording frame of 13 rows×182 bytes (3266 bytes) is modulated continuously. Two synchronous codes are added to the modulated frame. One synchronous code is added in front of column 0 and the other synchronous code is added in front of column 91. At the start of the data field, the state of synchronous code SY0 is state 1 (state 1 in FIG. 25). The recording data field includes 13 sets×2 sync frames as shown in FIGS. 24A and 24B. A recording data field with a 29016 channel bit length is equivalent to 2418 bytes before modulation.

SY0 to SY3 in each of FIGS. 24A and 24B are synchronous codes (SYNC), which are selected from the codes shown in FIG. 25. Numeral 24 and numeral 1092 in FIGS. 24A and 24B are channel bit lengths.

In FIGS. 24A and 24B, PO (Parity Outer code) information shown in FIG. 23 is inserted in the last two sync frames (i.e., the part where a set of the part where the last SYNC code is SY3 and the immediately following sync data and a set of the part where SYNC code is SY1 and the immediately following sync data are arranged side by side) in each of an even-numbered recording data field and an odd-numbered recording data field. In FIGS. 24A and 24B, 12 rows, a part of FIG. 23, are taken out.

A part of the left-side PO shown in FIG. 22 is inserted in the last two sync frames in the even-numbered recording data field. A part of the right-side PO shown in FIG. 22 is inserted in the last two sync frames in the odd-numbered recording data field. As shown in FIG. 22, one ECC block is composed of a right and a left small ECC block. Data about PO groups differing alternately according to the sector (about whether a PO belongs to the left small ECC block or the right small ECC block) is inserted.

The left-side data field where synchronous codes SY3, SY1 are present successively is shown in FIG. 24A. The right-side data field where synchronous codes SY3, SY1 are present successively is shown in FIG. 24B. The ECC block is configured as described above. In the concept of the present invention, the method of replacing the right-side rows with the left-side ones (in units of six rows) is not necessarily required as shown in FIG. 22.

As described above, the recording ECC block, or 32 data frames, is in the state where the block of FIG. 23 has been modulated and then added with the synchronous code.

FIG. 26A schematically shows the way the recording ECC block is arranged on a recording track physically. In the present invention, a guard area is placed before and after the recording ECC block. The total of the guard areas before and after the recording ECC block corresponds to one SYNC in FIG. 23.

As shown in FIG. 26B, the recording data cluster is divided into physical segments 0 to 6. The format of one physical segment is composed of 17 wobble data units as shown in FIG. 26C.

One wobble data unit has a format as shown in FIG. 26D. Specifically, synchronous signals (two bits), 1b, 0b, are placed at the head, followed by substantial data (three bits). One bit in the data is represented in 4 wobbles. Therefore, three bits are represented in 12 wobbles. One bit in the synchronous signal is represented in two wobbles. The remaining part of the wobble data unit is zero. There are unmodulated 68 wobbles in the remaining part. When the demodulated data in the wobble data units 0 to 17 are gathered together, this creates data with a specific meaning.

The above physical structure is as follows: one data segment=7 physical segments; one physical segment=17 wobble data units; one wobble data unit=84 wobbles; and one wobble=93 channel bits.

One sector is composed of 26 synchronous frames (sync frames in FIGS. 24A and 24B). Since one ECC block is composed of 32 sectors, it is expressed in frames as 26×32=832 sync frames. In the present invention, one sync frame is added as a guard area. As a result, in FIG. 26A, the number of frames is 832+1=833 frames. If numeral 833 is a data segment column, it follows that 833=7×7×17.Thus, one data segment can be composed of seven physical segments. That is, if one segment length is 199 frames, it follows that 119×7=833.As a result, a structure indivisible by E=2 or E=4 can be realized. The effect of the structure is the same as explained in FIG. 6.

Furthermore, as shown in FIG. 26D, there is an unmodulated section in the wobble data unit. Since in the unmodulated section, a stable, high-quality wobble signal (carrier) can be reproduced, a phase synchronous process using a wobble signal can be realized in this section. That is, in reproducing the data, a stable clock must be reproduced. As a reference signal for such a stable clock, the wobble signal reproduced in the unmodulated section can be used.

Figures 27A, 27B, 27C, 27D:
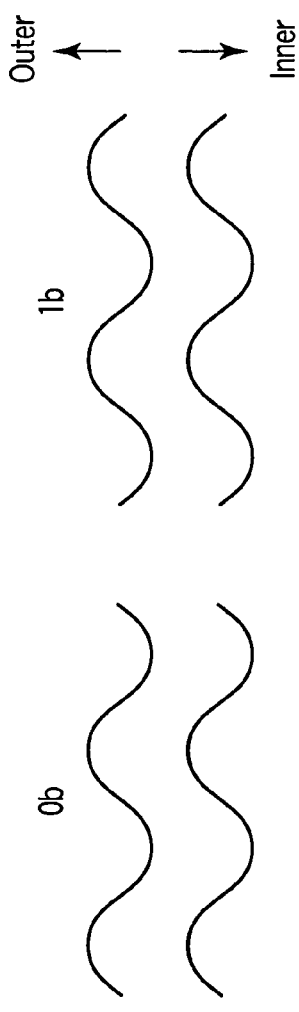
FIGS. 27A to 27D are explanatory diagrams of a layout of a wobble data unit.

FIG. 17 shows a layout of the wobble data unit. The wobble data unit indicating SYNC has a layout as shown in FIG. 27A composed of three bits, 1 (6 wobbles), 0 (4 wobbles), 1 (6 wobbles), and a succession of 0 bits (168 wobbles unmodulated). A wobble data unit in a concrete data section has a layout as shown in FIG. 27B (the structure of this unit is as explained in FIG. 26D). In addition, a wobble data unit representing monotone is a succession of 0 bits (84 wobbles unmodulated). A wobble waveform representing bit 0 and that representing bit 1 have phases with respect to the outer and inner edges of a disk as shown in FIG. 27D.

Figure 28A:
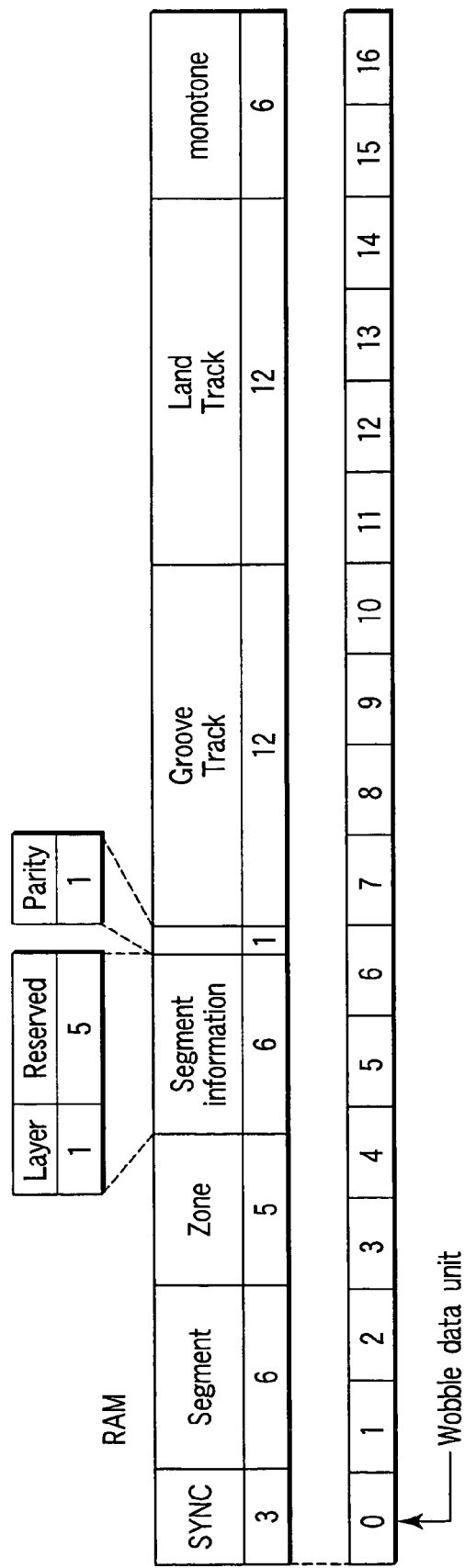
FIGS. 28A and 28B shows an layout of a physical address for a next-generation RAM and a layout of a physical address for a next-generation R, respectively.
Figure 28B:
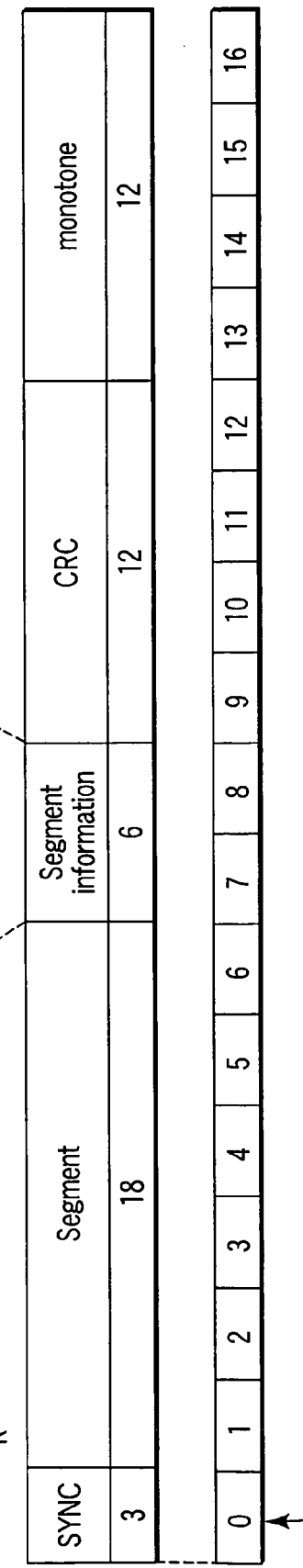

FIG. 28A shows a layout of a physical address for a next-generation RAM. FIG. 28B shows a layout of a physical address for a next-generation R. The physical address of a next-generation RAM of FIG. 28A will be explained. The physical address is composed of areas including a synchronous (SYNC) signal indicating the head of the address, a signal representing a segment, a signal representing a zone, segment information (including information representing a layer), parity, groove track number, land track number, and data on monotone. The physical address is represented by 17 wobble data units. SYNC is represented in three bits as shown in FIG. 27A. The segment is represented in 6 bits, the zone is represented in 5 bits, the segment information is represented in 6 bits, and groove and land tracks are represented in 12 bits. The physical address of a next-generation R of FIG. 28B is composed of areas including a synchronous (SYNC) signal indicating the head of the address, a signal representing a segment, segment information (including information representing a layer), information representing CRC (correction code), data on monotone. The physical address is represented by 17 wobble data units. SYNC is represented in three bits as shown in FIG. 27A. The segment is represented in 18 bits, the segment information is represented in 6 bits, and CRC is represented in 12 bits.

Figure 29:
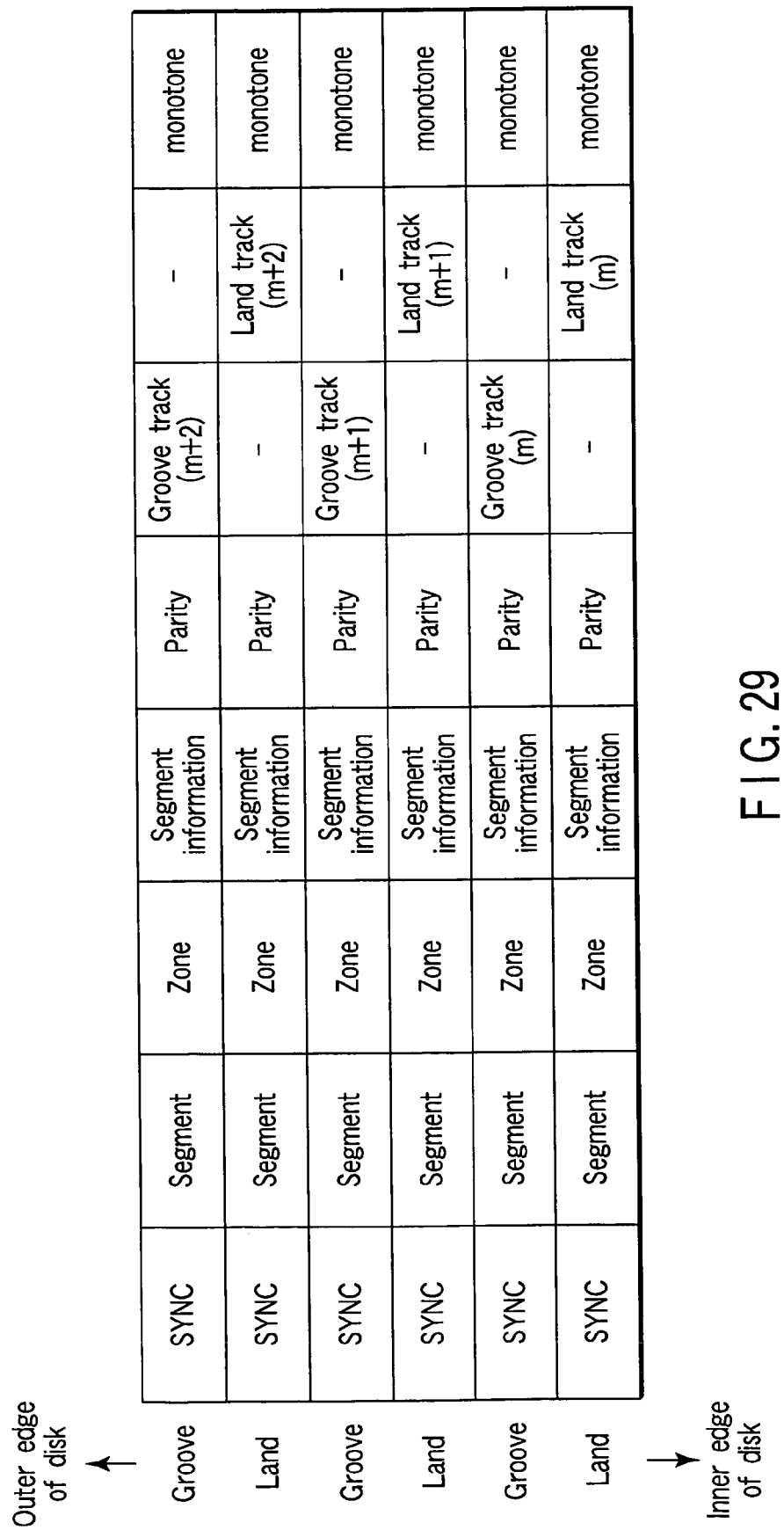
FIG. 29 shows the physical address layout of a next-generation RAM in further detail.

FIG. 29 shows a physical address layout of a next-generation RAM in which physical addresses are written according to the format shown in FIG. 28A. In the address for the groove recording track, a synchronous (SYNC) signal, segment, zone, segment information, parity, groove track number, invalid section, and monotone are arranged in that order. In the address for the land recording track, a synchronous (SYNC) signal, segment, zone, segment information, parity, invalid section, land track number, and monotone are arranged in that order.

Figure 30:
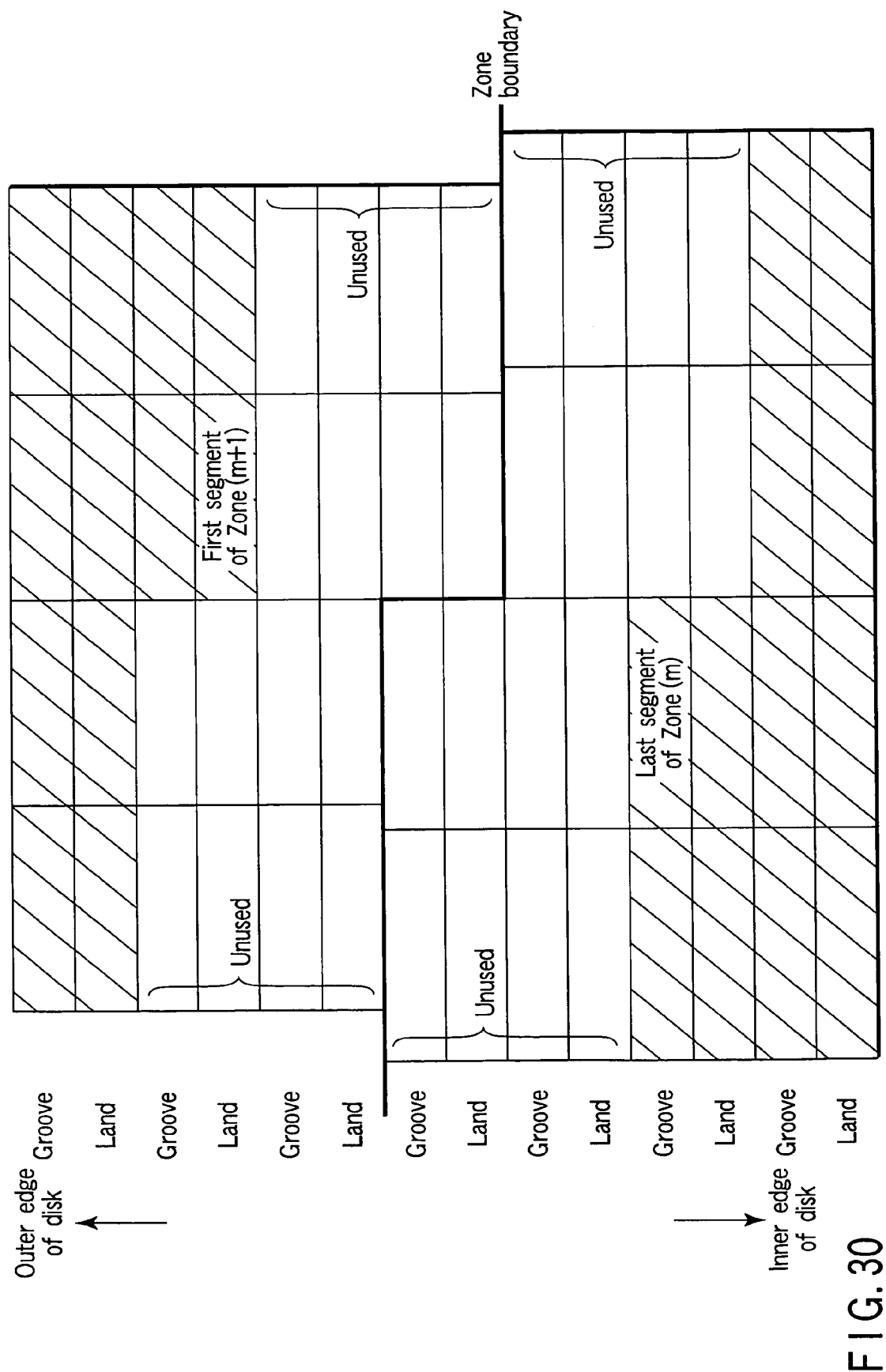
FIG. 30 shows a part of the zone boundary part in a next-generation RAM.

FIG. 30 shows a part of the zone boundary section of a next-generation RAM. In this system, the head of a zone (e.g., first segment of zone (m+1)) is a land track. In the zone boundary, four tracks on both sides of the boundary line are unused. In FIG. 30, the blank parts means unused.

Figure 31:
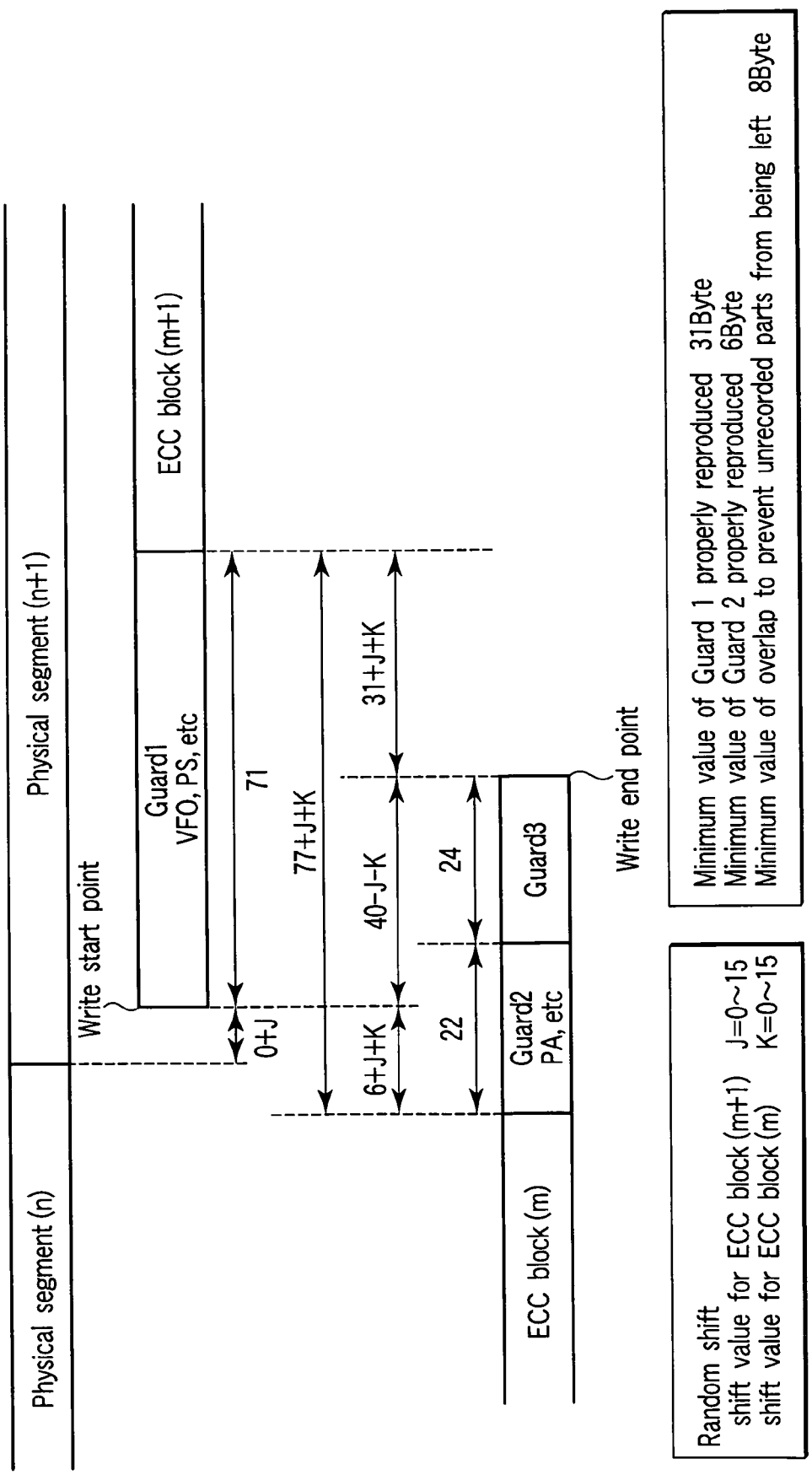
FIG. 31 shows a layout of the rewritable part in a next-generation RAM.

FIG. 31 shows a layout of the rewritable part of a next-generation RAM. In the present invention, in a data segment, a guard area is added in front of and behind the recording ECC block. In front of the ECC block, for example, a 71-byte guard area (Guard 1) is provided. Behind the ECC block, for example, a 22-byte guard area (Guard 2) is provided. The guard area amounts to 93 bytes in total, which corresponds to exactly one (SYNC) frame.

The random shift value of the recording data segment is in the range of 0 to 15 (less than 16 bytes). FIG. 31 shows a case where an ECC block (m) has been written into already and the writing has been completed once. Then, writing is started with ECC block (m+1). When data writing-has been completed once, a guard (Guard 3) (equivalent to 24 bytes) has been added to the end of the data. When data segments are written consecutively, the third guard is not written but is added to the end of only the last data segment which has been written.

In the concatenating area, the guard 2 of a data segment overlaps with the guard 1 of the following data segment by eight bytes or more (or 7.75 bytes or more), thereby preventing an unrecorded area from being left. At least the first 31 bytes of the ECC string are guaranteed not to be overwritten (in the figure, they are shown by section 31+J+K). In addition, at least the last six bytes of the ECC string are guaranteed not to be overwritten (in the figure, they are shown by section 6+J+K). K is the random shift value of the preceding ECC string (m). J bytes are the random shift value of the following ECC string (m+1).

Figure 32:
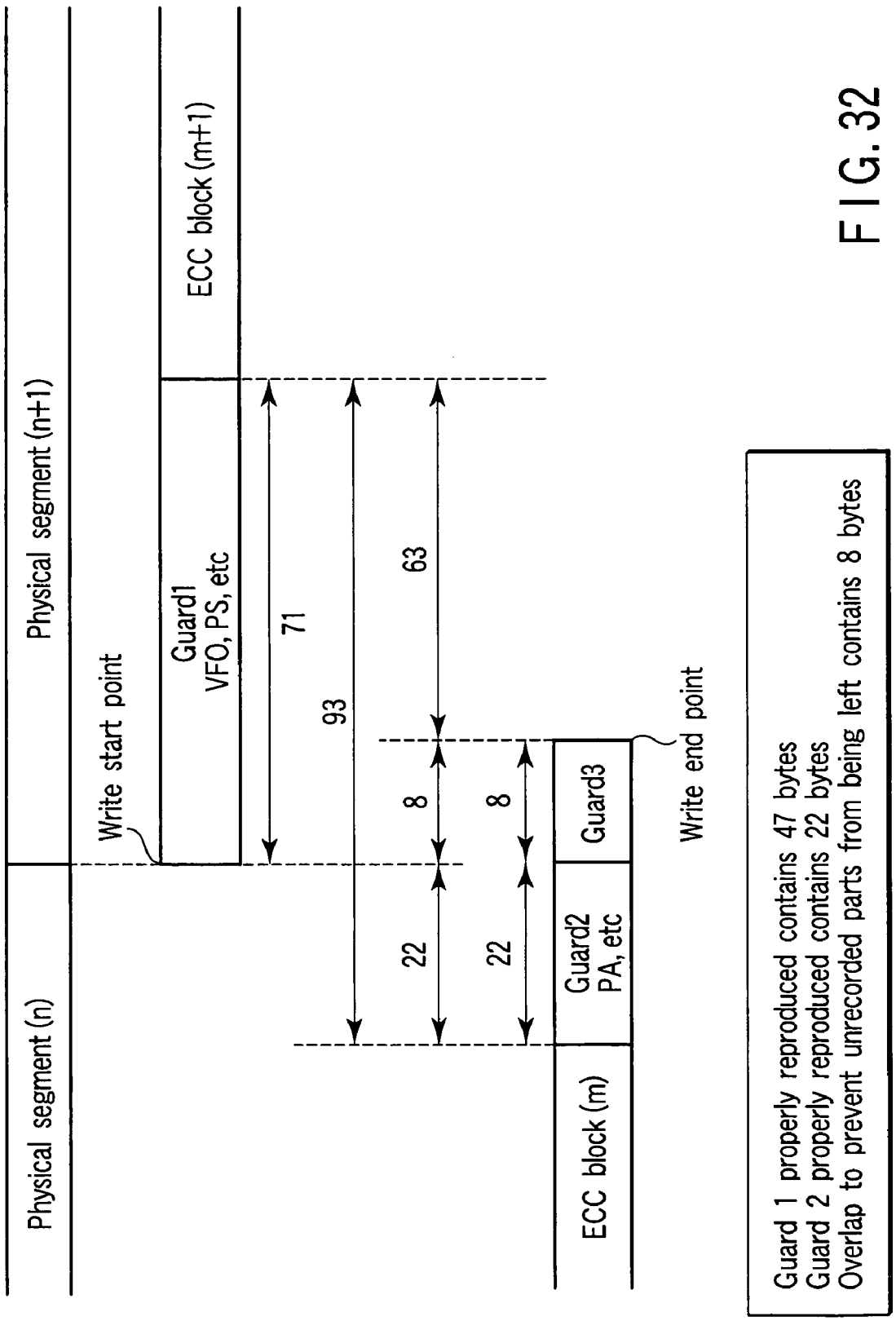
FIG. 32 shows a layout of the rewritable part in a next-generation R.

FIG. 32 shows a layout of the rewritable part of a next-generation R. In this case, too, a third guard (Guard 3) containing eight bytes is added to only the last data segment in writing. The guard 2 at the end of the preceding data segment overlaps with the guard 1 at the beginning of the next data segment by eight bytes or more, thereby preventing an unrecorded area from being left. In this disk, the guard 1 in proper reproduction contains 47 bytes and the guard 2 in proper reproduction contains 22 bytes.

Figure 33:
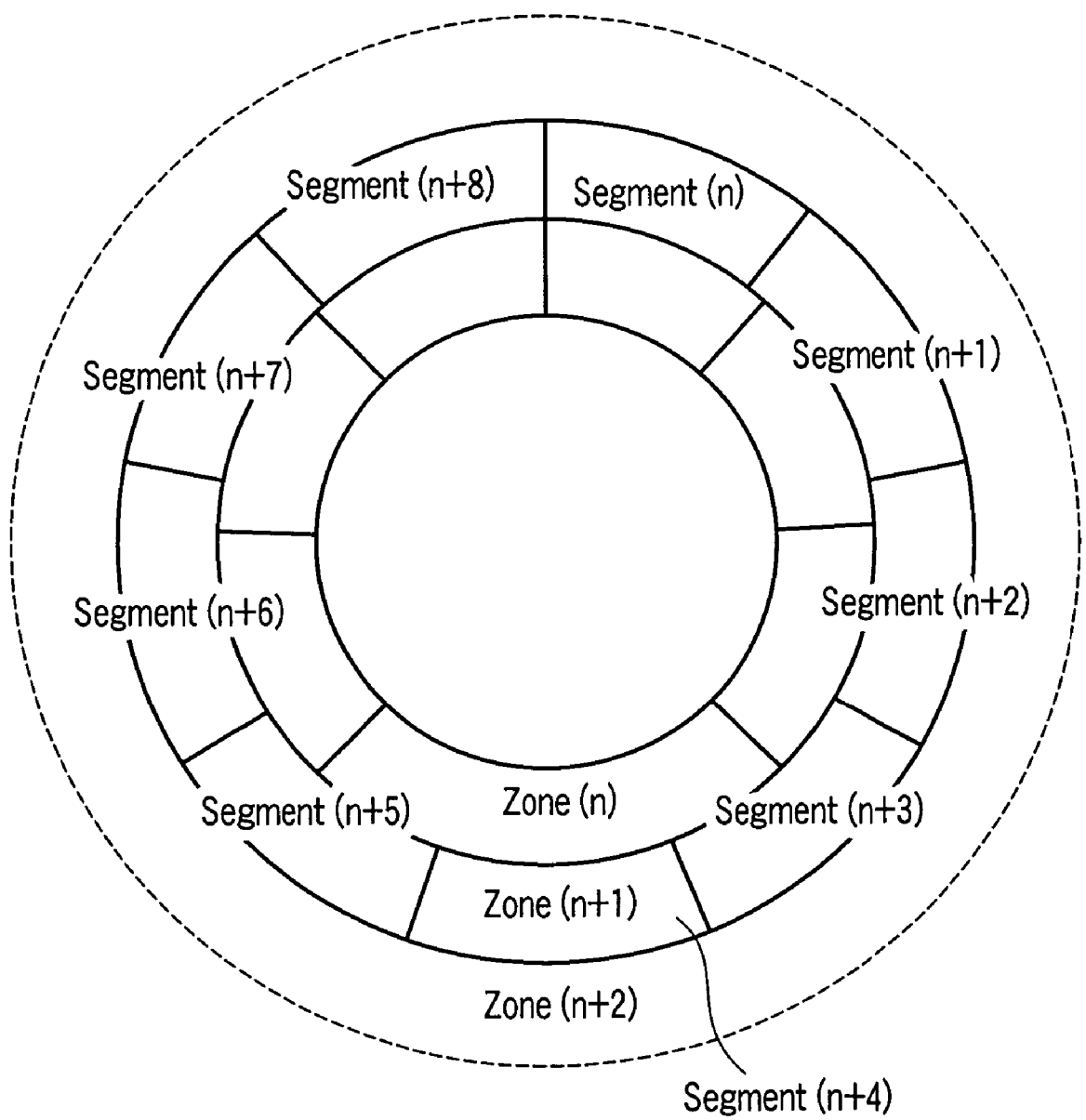
FIG. 33 is an explanatory diagram of a zone structure of a rewritable information recording medium.

The present invention, when representing track addresses, uses the Gray code, thereby improving the accuracy of address detection. A rewritable information recording medium of the present invention has a zone structure as shown in FIG. 33.

The present invention is based on the following specifications:

Reproduction line speed: 5.6 m/s
Channel length: 0.086 μm
Track pitch: 0.34 μm
Channel frequency: 64.8 MHz
Recording data (RF signal): (1,7) RLL
Wobble carrier frequency: about 700 KHz (93T/Wobble)
Modulated phase difference [deg]: ±90.0
Segment/track: 12 to 29 segments
Zone: about 18 zones In the present invention, the address information in a recording-type information recording medium has been recorded in advance by wobble modulation. Not only ±90° (180°) phase modulation but also NRZ (Non-Return-to-Zero) method is used as a wobble modulation method. For a rewritable information recording medium, an L/G (Land-and-Groove) recording method is used. The embodiment of the present invention is characterized by using the wobble modulation system in the L/G recording method.

Figure 34:
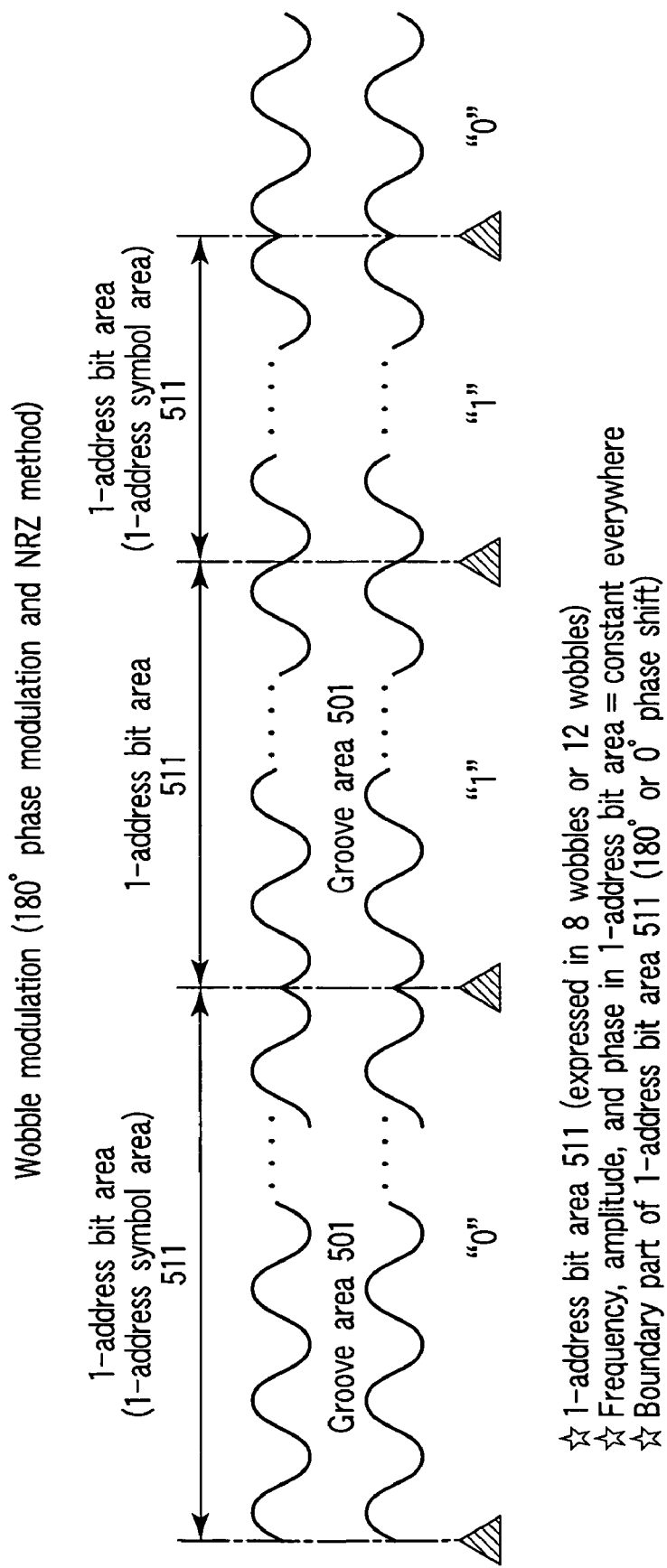
FIG. 34 is an explanatory diagram of wobble modulation.

Using FIG. 34, a concrete explanation will be given. In the embodiment, the inside of a 1-address bit (also referred to as an address symbol) area 511 is expressed in 8 wobbles or 12 wobbles. In the 1-address bit area 511, the frequency, amplitude, and phase coincide with one another all over the area. When the same value continues as the values of address bits, the same phase lasts at the boundary part of each 1-address bit area 511 (the part marked with a shaded triangle in FIG. 34). When the address bit is inverted, the reversal of the wobble pattern (a 180° phase shift) takes place.

As information representing addresses on the information recording medium 221, the rewritable information recording medium of the invention has zone number information serving as zone identification information, segment number information serving as segment address information, and track number information serving as track address information. The segment number means the number for one circumference and the track number means a number in a zone. When the zone structure shown in FIG. 33 is used, the in-zone identification information in the address information and the segment address information take the same values between adjacent tracks. As for the track address information, the address information differs from one track to an adjacent track.

Figure 35:
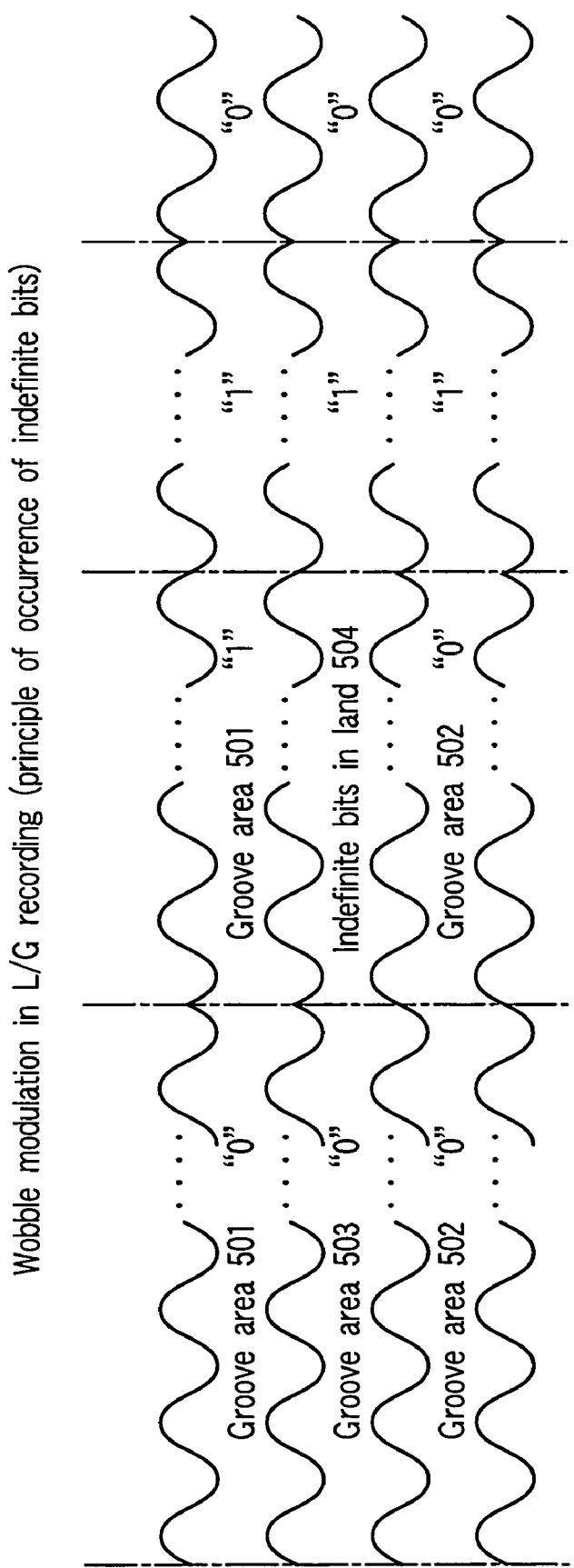
FIG. 35 is an explanatory diagram of the wobble modulation section in land-groove recording.

As shown in FIG. 35, consider a case where ". . . 0110 . . . " is recorded as track address information in the groove area 501 and ". . . 0010 . . . " is recorded as track address information in the groove area 502. In this case, in adjacent groove areas, the land width varies periodically in the land area 503 sandwiched between "1" and "0", with the result that an area where address bits in wobbles are not determined appears. In the present invention, this area is called "indefinite bit area 504." When a condensing spot passes through the indefinite bit area 504, since the land width varies periodically, the total amount of light that is reflected there, passes through the objective (not shown), and comes back varies periodically. Since a recording mark is also formed in the indefinite bit area 504 in the land, the reproduced signal of the recording mark fluctuates periodically under the influence, which causes the problem of degrading the reproduced signal detecting characteristic (or impairing the error rate of the reproduced signal).

Therefore, to reduce the frequency of occurrence of the indefinite bit area 504, known Gray code or the Gray code is improved in the present invention.

FIG. 36 shows the Gray code. The Gray code is characterized in that only one bit changes (or "1" and "0" change alternately) each time a change of "1" is made in the decimal system. The Gray code is used to represent the groove track numbers and land track numbers explained in FIG. 28.

Next, the recording system and reproducing system of the present invention will be explained.

Figure 37:
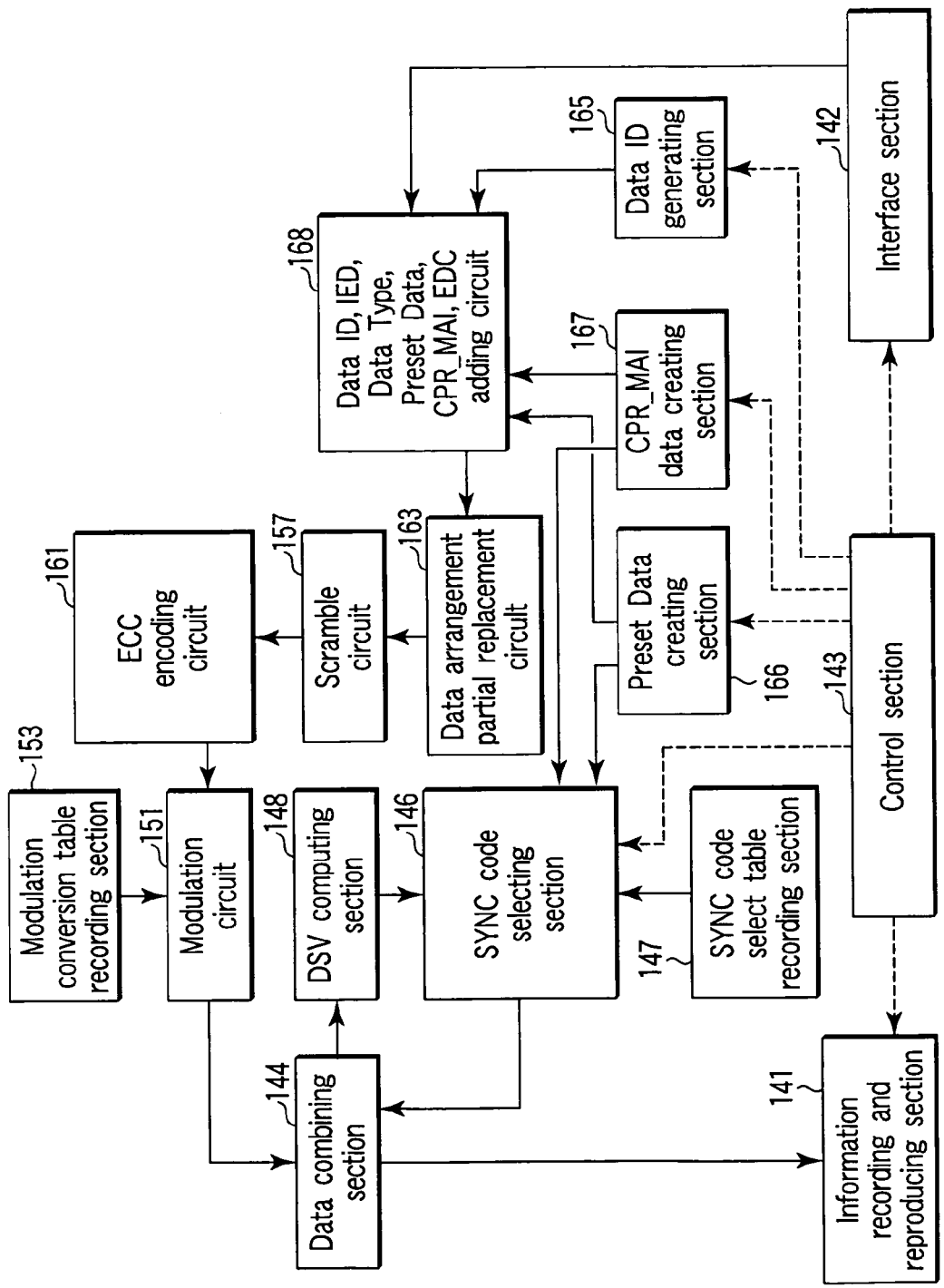
FIG. 37 is an explanatory diagram showing an apparatus for a recording system related to the present invention.

In FIG. 37, an interface section 14 takes in data. The taken-in main data is directed to a data addition section 168, which starts such a data process as obtains an ECC block. A data ID generating section 165 outputs a data ID to the data adding section 168. A CPR_MAI data creating section 167 outputs data about copy protection to the data addition section 165. A preset data creating section 166 outputs preset data to the data adding section 165. The data outputted from the data adding section 168 is subjected to such data arrangement as the interleave process explained earlier at a data arrangement partial replacement section 163. In addition, a scramble circuit 157 scrambles the main data part. An ECC encoding circuit 161 adds PO and PI to the output of the scramble circuit 157 and further performs the interleaving of PO (a distribution process). The resulting ECC block is inputted to a modulation circuit 151, which converts the inputted signal into a modulated signal. At this time, according to the input data, a modulation code in a modulation conversion table 153 is selected. A data combining section 144 adds a synchronous code (SYNC) to the modulated data from the modulation circuit 151. A synchronous code selecting section 146 selects a synchronous code from a synchronous code select table recording section 147. At the time of selection, a DSV value computing section 148 controls the selection of a synchronous code so that a run of "0" and "1" may fit in a specific range in the concatenating range of the synchronous code and data. The data combining section 144 supplies a recording signal to an information recording and reproducing section 141. A control section 143 is for supervising all of the remaining blocks.

FIG. 38 shows the reproducing system. The signal outputted from the information recording and reproducing section 141 is inputted to a wobble demodulation circuit 150, a synchronous code position extracting section 145, and a demodulation circuit 152. The wobble signal demodulated at the wobble signal demodulation circuit 150 is used as, for example, a reference signal to a spindle motor rotation control circuit 160. The synchronous code (SYNC) extracted at the synchronous code extracting circuit 145 controls the timing of the demodulation circuit 152. The demodulation circuit 512 demodulates the modulated signal using a conversion table recorded in a demodulation conversion table recording section 154. The demodulated signal is inputted to an ECC decoding circuit 162. The ECC decoding circuit 162 processes ECC blocks. Specifically, the ECC decoding circuit 162 sets PO in the original state and carries out an error correcting process using the PO (16 bytes) and PI (10 bytes). Next, a descrambling circuit 159 descrambles the main data section. Then, a data arrangement partial replacement section 164 returns the rows where the right and left blocks have been replaced with each other to the original block arrangement. In this state, a main data extracting section 173 can extract the demodulated main data. This data is outputted via the interface 142. Furthermore, the output of the data arrangement partial replacement section 164 is supplied to a data ID extracting section 171. The extracted data ID is inputted as recognition data and timing data to the control section 143. A part of the data ID is descrambled at a descramble circuit 158. An error check section 172 makes an error check. If the data ID is not correct, the control section 143 takes in the data again.

Additional advantages and modifications will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

What is claimed is:

1. An optical disk medium with a spiral recording track divided into physical segments of a specific length each of which has a preformat modulation section formed in a specific position of a part of the segment, the optical disk medium comprising:
    a recording data string composed of a plurality of synchronous frames each of which is formed by dividing an original data string of a specific length into blocks, creating error correction codes, adding the codes to the blocks, and further placing a fixed number of data items converted into synchronous data and coding data;
    data items in the coding data contributing to the creation of the same error correction code which are arranged at regular intervals of E in the recording data string, with a data segment length L obtained by adding an additional synchronous frame to the recording data string and a physical segment length A satisfying the equation L=mA where m is a natural number and, A is set indivisible by E.

2. The optical disk medium according to claim 1, wherein the recording track is wobbled at a specific single frequency, the wobbling is modulated in the preformat modulation section, and the preformat modulation section is 20% or less of the physical segment.

3. The optical disk medium according to claim 1, wherein a data recording start position and a data recording end position lie in the additional synchronous frame.

4. The optical disk medium according to any one of claims 1 to 3, wherein the optical disk medium is a medium with a CAV (constant angular velocity) configuration or a zone CAV configuration,
    the physical segments are arranged radially in a single zone, and
    the interval E, the data segment length L, and the physical segment length A are expressed in units of a prospect angle with respect to the center of the disk.

5. The optical disk medium according to claim 2, wherein the optical disk medium is an optical disk which has land recording tracks and groove recording tracks and causes groove walls on the right and left sides of a recording track to wobble in phase with each other and which has a part where groove walls on the right and left sides vary in opposite phase with each other in a part of the preformat modulation section in the physical segment area.

6. An optical disk apparatus for recording data onto and reproducing data from an optical disk medium with a spiral recording track divided into physical segments of a specific length each of which has a preformat modulation section formed in a specific position of a part of the segment, the optical disk apparatus comprising:
    a recording data string composed of a plurality of synchronous frames each of which is formed by dividing an original data string of a specific length into blocks, creating error correction codes, adding the codes to the blocks, and further placing a fixed number of data items converted into synchronous data and coding data;
    data items in the coding data contributing to the creation of the same error correction code which are arranged at regular intervals of E in the recording data string, with a data segment length L obtained by adding an additional synchronous frame to the recording data string and a physical segment length A satisfying the equation L=mA where m is a natural number and, A is set indivisible by E.

7. The optical disk apparatus according to claim 6, wherein a data recording start position and a data recording end position lie in the additional synchronous frame.

8. A reproduction only optical disk medium which has the same recording data structure as that of the format used for a recording-type optical disk according to claim 1 and which has data strings recorded thereon in prepits beforehand.

* * * * *